(12) United States Patent
Cho et al.

(10) Patent No.: US 12,370,865 B2
(45) Date of Patent: Jul. 29, 2025

(54) HEAT PUMP SYSTEM OF VEHICLE

(71) Applicants: Hyundai Motor Company, Seoul (KR); Kia Corporation, Seoul (KR)

(72) Inventors: Wan Je Cho, Hwaseong-si (KR); Yong Woong Cha, Yongin-si (KR); Seong-Bin Jeong, Hwaseong-si (KR); Man Hee Park, Suwon-si (KR); Jae Yeon Kim, Hwaseong-si (KR); Dong Seok Oh, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 203 days.

(21) Appl. No.: 18/297,825

(22) Filed: Apr. 10, 2023

(65) Prior Publication Data

US 2024/0166020 A1 May 23, 2024

(30) Foreign Application Priority Data

Nov. 18, 2022 (KR) ........................ 10-2022-0155062

(51) Int. Cl.
*B60H 1/00* (2006.01)
*B60L 58/26* (2019.01)

(52) U.S. Cl.
CPC ..... *B60H 1/00899* (2013.01); *B60H 1/00278* (2013.01); *B60H 1/00885* (2013.01); *B60H 2001/00949* (2013.01); *B60L 58/26* (2019.02)

(58) Field of Classification Search
CPC ............ B60H 1/00899; B60H 1/00278; B60H 1/00885; B60H 2001/00949; B60H 1/00; B60H 1/22; B60H 2001/00928; B60H 1/00921; B60H 2001/00307; B60H 1/00007; B60H 1/00385; B60H 1/00485; B60H 1/3227; B60H 1/3228; B60H 1/32284; B60H 1/143; B60H 1/3211; B60H 1/323; B60H 2001/3285; B60L 58/26; B60Y 2200/90

See application file for complete search history.

(56) References Cited

U.S. PATENT DOCUMENTS

| | | | |
|---|---|---|---|
| 10,118,458 B2 * | 11/2018 | Kim | B60K 1/04 |
| 10,173,491 B2 * | 1/2019 | Kim | B60H 1/00278 |
| 10,183,544 B2 * | 1/2019 | Kim | F25B 25/005 |
| 10,717,337 B2 * | 7/2020 | Kim | B60L 58/24 |
| 10,814,692 B2 * | 10/2020 | Kim | B60H 1/32284 |
| 10,974,566 B2 * | 4/2021 | Kim | B60H 1/00921 |
| 11,007,850 B2 * | 5/2021 | Kim | B60H 1/00921 |

(Continued)

*Primary Examiner* — Ljiljana V. Ciric
(74) *Attorney, Agent, or Firm* — Slater Matsil, LLP

(57) ABSTRACT

A heat pump system of a vehicle includes a first cooling device including a battery module and a first line for circulating a coolant, an air conditioner unit including a compressor, an internal condenser, a main heat exchanger, a first expansion valve, and an evaporator that are interconnected through a refrigerant line for circulating a refrigerant, and a chiller connected to the first cooling device through the first line, connected to the refrigerant line through a first connection line, and configured to adjust a coolant temperature through heat-exchanging a selectively introduced coolant with the refrigerant. The air conditioner unit further includes a second expansion valve, a first valve, a second valve, a second connection line, a third connection line, and a fourth connection line.

11 Claims, 8 Drawing Sheets

(56) References Cited

U.S. PATENT DOCUMENTS

| | | | | |
|---|---|---|---|---|
| 11,046,147 B2* | 6/2021 | Takeichi | | B60H 1/00899 |
| 11,065,934 B2* | 7/2021 | Lee | | B60H 1/00328 |
| 11,155,138 B2* | 10/2021 | Kim | | B60H 1/00428 |
| 11,186,137 B2* | 11/2021 | Kim | | B60H 1/32284 |
| 11,207,940 B2* | 12/2021 | Lee | | B60H 1/00278 |
| 11,207,941 B2* | 12/2021 | Lee | | B60H 1/00885 |
| 11,305,607 B2* | 4/2022 | Kim | | B60H 1/2221 |
| 11,318,816 B2* | 5/2022 | Kim | | B60H 1/3213 |
| 11,325,444 B2* | 5/2022 | Kim | | B60H 1/3227 |
| 11,325,445 B2* | 5/2022 | Kim | | B60H 1/00392 |
| 11,342,603 B2* | 5/2022 | Tomai | | B60L 58/25 |
| 11,351,838 B2* | 6/2022 | Kim | | B60H 1/00485 |
| 11,358,435 B2* | 6/2022 | Kim | | B60H 1/00885 |
| 11,370,265 B2* | 6/2022 | Lee | | B60H 1/00885 |
| 11,376,921 B2* | 7/2022 | Kim | | B60H 1/00921 |
| 11,390,141 B2* | 7/2022 | Kim | | B60H 1/00885 |
| 11,427,050 B2* | 8/2022 | Kim | | B60H 1/005 |
| 11,446,978 B2* | 9/2022 | Bara | | B60H 1/32284 |
| 11,448,437 B2* | 9/2022 | Ryu | | B60H 1/00899 |
| 11,448,438 B2* | 9/2022 | Waters | | F25B 41/22 |
| 11,458,798 B2* | 10/2022 | Lee | | B60H 1/00921 |
| 11,458,811 B2* | 10/2022 | Kim | | B60H 1/00007 |
| 11,458,812 B2* | 10/2022 | Jeong | | B60H 1/00907 |
| 11,479,076 B2* | 10/2022 | Kim | | B60H 1/00485 |
| 11,479,077 B2* | 10/2022 | Kim | | B60H 1/32284 |
| 11,505,034 B2* | 11/2022 | Kim | | B60H 1/00278 |
| 11,505,038 B2* | 11/2022 | Kim | | B60H 1/32284 |
| 11,529,844 B2* | 12/2022 | Kim | | B60H 1/00885 |
| 11,541,721 B2* | 1/2023 | Kim | | B60H 1/00885 |
| 11,571,944 B2* | 2/2023 | Lindquist | | B60H 1/2221 |
| 11,571,948 B2* | 2/2023 | Kim | | B60H 1/32284 |
| 11,602,977 B2* | 3/2023 | Kim | | B60H 1/3227 |
| 11,613,164 B2* | 3/2023 | Kim | | B60H 1/00278 |
| | | | | 62/185 |
| 11,634,004 B2* | 4/2023 | Kim | | B60H 1/2221 |
| | | | | 62/259.2 |
| 11,654,744 B2* | 5/2023 | Kim | | B60H 1/00821 |
| | | | | 62/159 |
| 11,739,994 B2* | 8/2023 | Chatham | | B60H 1/00921 |
| | | | | 62/238.7 |
| 11,745,561 B2* | 9/2023 | Hasegawa | | H01M 10/625 |
| | | | | 62/238.6 |
| 11,760,153 B2* | 9/2023 | Kim | | B60H 1/00921 |
| | | | | 165/41 |
| 11,780,297 B2* | 10/2023 | Lee | | B60H 1/32284 |
| | | | | 62/160 |
| 11,794,550 B2* | 10/2023 | Kim | | B60H 1/00278 |
| 11,858,309 B2* | 1/2024 | Song | | B60H 1/00278 |
| 11,870,045 B2* | 1/2024 | Kim | | H01M 10/6569 |
| 11,904,656 B2* | 2/2024 | Jo | | B60H 1/3222 |
| 11,904,657 B2* | 2/2024 | Hwang | | B60H 1/14 |
| 11,958,332 B2* | 4/2024 | Kim | | B60H 1/00814 |
| 11,987,095 B2* | 5/2024 | Kim | | H01M 10/613 |
| 12,030,367 B2* | 7/2024 | Kim | | B60H 1/00278 |
| 12,061,031 B2* | 8/2024 | Lee | | B60H 1/00392 |
| 12,090,816 B2* | 9/2024 | Kim | | B60H 1/00328 |
| 12,122,218 B2* | 10/2024 | You | | B60H 1/00485 |
| 12,128,736 B2* | 10/2024 | Cho | | B60H 1/00278 |
| 12,145,425 B2* | 11/2024 | Kim | | B60H 1/00921 |
| 12,157,345 B2* | 12/2024 | Kim | | B60H 1/00278 |
| 12,168,386 B2* | 12/2024 | Kim | | B60H 1/32284 |
| 12,172,493 B2* | 12/2024 | Jeong | | B60H 1/00385 |
| 12,179,551 B2* | 12/2024 | Shi | | B60H 1/00921 |
| 12,215,907 B2* | 2/2025 | Lumley | | F25B 25/005 |
| 12,220,966 B2* | 2/2025 | Kim | | B60H 1/143 |
| 12,227,055 B2* | 2/2025 | Jeong | | B60H 1/00278 |
| 12,233,686 B2* | 2/2025 | Jeong | | B60H 1/32284 |
| 12,240,290 B2* | 3/2025 | Kim | | B60H 1/3216 |
| 12,251,987 B2* | 3/2025 | Kim | | B60H 1/32284 |
| 12,257,877 B2* | 3/2025 | Xie | | B60H 1/00392 |
| 12,280,633 B2* | 4/2025 | Jeong | | B60H 3/024 |
| 12,281,823 B2* | 4/2025 | Jin | | B60H 1/00278 |
| 2019/0118619 A1* | 4/2019 | Kim | | B60H 1/143 |
| 2019/0135075 A1* | 5/2019 | Hwang | | B60H 1/00278 |
| 2022/0274463 A1* | 9/2022 | Koo | | B60H 1/00885 |
| 2022/0396117 A1* | 12/2022 | Kim | | B60H 1/323 |
| 2023/0173883 A1* | 6/2023 | Jeong | | B60H 3/024 |
| 2023/0202258 A1* | 6/2023 | Kim | | B60H 1/32281 |
| | | | | 62/160 |
| 2023/0311611 A1* | 10/2023 | Kim | | B60H 1/00921 |
| | | | | 165/202 |
| 2023/0322048 A1* | 10/2023 | Durrani | | H01M 10/613 |
| | | | | 62/115 |
| 2023/0382187 A1* | 11/2023 | Höfler | | B60H 1/00921 |
| 2023/0415540 A1* | 12/2023 | Hensel | | B60H 1/00392 |
| 2024/0034129 A1* | 2/2024 | Kim | | B60H 1/00899 |
| 2024/0066953 A1* | 2/2024 | Yun | | B60H 1/3205 |
| 2024/0092139 A1* | 3/2024 | Yun | | B60H 1/00907 |
| 2024/0109398 A1* | 4/2024 | Kim | | B60H 1/00921 |
| 2024/0140171 A1* | 5/2024 | Wei | | B60H 1/00885 |
| 2024/0140172 A1* | 5/2024 | Kim | | F01P 7/14 |
| 2024/0166016 A1* | 5/2024 | Cho | | B60H 1/00485 |
| 2024/0166020 A1* | 5/2024 | Cho | | B60H 1/00278 |
| 2024/0174053 A1* | 5/2024 | Kim | | B60H 1/00921 |
| 2024/0181843 A1* | 6/2024 | Cho | | B60H 1/00899 |
| 2024/0190209 A1* | 6/2024 | Kim | | B60H 1/3228 |
| 2024/0213582 A1* | 6/2024 | Seo | | H01M 8/04029 |
| 2024/0367487 A1* | 11/2024 | Kim | | B60H 1/00878 |
| 2024/0375481 A1* | 11/2024 | Jeong | | B60H 1/00899 |
| 2024/0399819 A1* | 12/2024 | Enokijima | | F25B 1/00 |
| 2024/0399824 A1* | 12/2024 | Kim | | B60H 1/00278 |
| 2024/0399828 A1* | 12/2024 | Li | | B60H 1/00278 |
| 2025/0010691 A1* | 1/2025 | Kim | | B60H 1/32284 |
| 2025/0128569 A1* | 4/2025 | Kim | | B60H 1/00907 |
| 2025/0128570 A1* | 4/2025 | Kim | | B60H 1/00914 |
| 2025/0128574 A1* | 4/2025 | Kim | | B60H 1/3228 |
| 2025/0128645 A1* | 4/2025 | Atluri | | H01M 10/663 |
| 2025/0135843 A1* | 5/2025 | Lee | | B60H 1/32 |

\* cited by examiner

HEAT PUMP SYSTEM OF VEHICLE

CROSS-REFERENCE TO RELATED APPLICATIONS

This application claims the benefit of Korean Patent Application No. 10-2022-0155062, filed on Nov. 18, 2022, which application is hereby incorporated herein by reference.

TECHNICAL FIELD

The present disclosure relates to a heat pump system of a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling system, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling system, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may be introduced into the vehicle interior, thereby deteriorating the ride comfort.

In addition, according to the conventional heat pump system, since the battery needs to be heated by using a heater for the battery in the case of low ambient air temperature, the overall performance of the battery may be deteriorated due to increasing of the electric power consumption and difficulty in the efficient temperature adjustment of the battery.

In addition, when heating the vehicle interior, the heating performance may be deteriorated due to the lack of a heat source, the electricity consumption may be increased due to the usage of the electric heater, and the power consumption of the compressor may be increased.

The above information disclosed in this background section is only for enhancement of understanding of the background of the disclosure, and therefore it may contain information that does not form the prior art that is already known to a person of ordinary skill in the art.

SUMMARY

The present disclosure relates to a heat pump system of a vehicle. Particular embodiments relate to a heat pump system of a vehicle capable of efficiently adjusting the temperature of battery module and improving the performance and efficiency of heating the battery module by using a single chiller providing heat-exchange between the refrigerant and the coolant.

Embodiments of the present disclosure provide a heat pump system of a vehicle capable of simplifying the system by adjusting the temperature of the battery module by using a single chiller providing heat-exchange between the refrigerant and the coolant.

In addition, embodiments of the present disclosure provide a heat pump system of a vehicle capable of minimizing the use of the coolant heater by efficiently increasing the temperature of the battery module by using the coolant heated while passing through a chiller.

A heat pump system of a vehicle may include a first cooling device including a battery module and a first line through which a coolant circulates, an air conditioner unit including a compressor, an internal condenser, a main heat exchanger, a first expansion valve, and an evaporator that are interconnected through a refrigerant line to circulate a refrigerant through the refrigerant line, and a chiller that is connected to the first cooling device through the first line, connected to the refrigerant line through a first connection line, and configured to adjust a coolant temperature through heat-exchanging a selectively introduced coolant with the refrigerant supplied from the air conditioner unit. The air conditioner unit may further include a second expansion valve provided on the first connection line upstream of the chiller, a first valve provided on the refrigerant line between the internal condenser and the main heat exchanger, a second valve provided on the first connection line at a rear end of the chiller, a second connection line of which a first end is connected to the first valve and a second end is connected to the first connection line between the chiller and the second expansion valve, a third connection line of which a first end is connected to the second expansion valve and a second end is connected to the refrigerant line between the evaporator and the compressor, and a fourth connection line of which a first end is connected to the second valve and a second end is connected to the refrigerant line between the main heat exchanger and the first valve.

The air conditioner unit may further include a heating, ventilation, and air conditioning (HVAC) module internally provided with the evaporator and an opening/closing door adjusting selective flowing of the ambient air having passed through the evaporator to the internal condenser according to a cooling mode, a heating mode, and a heating and dehumidifying mode of a vehicle interior, a sub-heat exchanger provided on the refrigerant line between the main heat exchanger and the evaporator, an accumulator provided on the refrigerant line between the evaporator and the compressor, a third expansion valve provided on the refrigerant line between the first valve and the main heat exchanger, a fifth connection line of which a first end is connected to a third valve provided on the refrigerant line between the main heat exchanger and the sub-heat exchanger and a second end is connected to the accumulator, a sixth connection line of which a first end is connected to the refrigerant line between the main heat exchanger and the third expansion valve, a fourth valve connected to a second end of the sixth connection line, a seventh connection line of which a first end is connected to the fourth valve and a second end is connected to the refrigerant line between the sub-heat exchanger and the third valve, and a dehumidification line of which a first end is connected to the fourth valve and a second end is connected to the refrigerant line between the first expansion valve and the evaporator.

A first end of the first connection line may be connected to the refrigerant line between the sub-heat exchanger and the first expansion valve. A second end of the first connection line may be connected to the refrigerant line between the accumulator and the evaporator.

For cooling of the battery module by using the coolant having heat-exchanged at the chiller, the second expansion valve may be configured to expand the refrigerant introduced through the first connection line and introduce the expanded refrigerant to the chiller.

In order to increase a temperature of the battery module, the first valve may open the second connection line such that the refrigerant supplied from the internal condenser is introduced to the chiller, and the second valve may open the fourth connection line such that the refrigerant having passed through the chiller is supplied to the main heat exchanger.

In the case of the cooling mode of the vehicle interior, the third expansion valve may be configured to allow the refrigerant supplied from the internal condenser to flow through the refrigerant line in an unexpanded state.

In the case of the heating mode, or the heating and dehumidifying mode of the vehicle interior, the fifth connection line may be opened by an operation of the third valve, and the sixth connection line may be opened by an operation of the fourth valve.

The seventh connection line may be opened by an operation of the fourth valve in the case of the heating mode of the vehicle interior and closed by the operation of the fourth valve in the case of the heating and dehumidifying mode of the vehicle interior.

The first, second, third, and fourth valves each may be a 3-way valve capable of distributing flow rates of the refrigerant while controlling flowing of the refrigerant. The second expansion valve may be a 3-way electronic expansion valve capable of selectively expanding the refrigerant while controlling flowing of the refrigerant. The third expansion valve may be a 2-way electronic expansion valve capable of selectively expanding the refrigerant while controlling flowing of the refrigerant.

The main heat exchanger may be connected to a second cooling device including an electrical component and a second line through which the coolant circulates, through the second line. The main heat exchanger may be configured to condense or evaporate an interiorly introduced refrigerant through heat exchange with the coolant supplied from the second cooling device according to a selective operation of the third expansion valve.

The sub-heat exchanger may be configured to additionally condense or evaporate the refrigerant condensed or evaporated at the main heat exchanger through heat exchange with the ambient air.

A heat pump system of a vehicle may include a first cooling device configured to circulate a coolant through a first line and provided with a battery module, an air conditioner unit including a compressor, an internal condenser, a main heat exchanger, a first expansion valve, and an evaporator that are interconnected through a refrigerant line to circulate a refrigerant through the refrigerant line, and a chiller that is connected to the first cooling device through the first line, connected to the refrigerant line through a first connection line, and configured to adjust a coolant temperature through heat-exchanging a selectively introduced coolant with the refrigerant supplied from the air conditioner unit. The air conditioner unit may further include a second expansion valve provided on the first connection line upstream of the chiller, a first valve provided on the refrigerant line between the compressor and the internal condenser, a second valve provided on the first connection line at a rear end of the chiller, a second connection line of which a first end is connected to the first valve and a second end is connected to the first connection line between the chiller and the second expansion valve, a third connection line of which a first end is connected to the second expansion valve and a second end is connected to the refrigerant line between the evaporator and the compressor, and a fourth connection line of which a first end is connected to the second valve and a second end is connected to the refrigerant line between the compressor and the internal condenser.

The air conditioner unit may further include a HVAC module internally provided with the evaporator and an opening/closing door adjusting selective flowing of the ambient air having passed through the evaporator to the internal condenser according to a cooling mode, a heating mode, and a heating and dehumidifying mode of a vehicle interior, a sub-heat exchanger provided on the refrigerant line between the main heat exchanger and the evaporator, an accumulator provided on the refrigerant line between the evaporator and the compressor, a third expansion valve provided on the refrigerant line between the internal condenser and the main heat exchanger, a fifth connection line of which a first end is connected to a third valve provided on the refrigerant line between the main heat exchanger and the sub-heat exchanger and a second end is connected to the accumulator, a sixth connection line of which a first end is connected to the refrigerant line between the main heat exchanger and the third expansion valve, a fourth valve connected to a second end of the sixth connection line, a seventh connection line of which a first end is connected to the fourth valve and a second end is connected to the refrigerant line between the sub-heat exchanger and the third valve, and a dehumidification line of which a first end is connected to the fourth valve and a second end is connected to the refrigerant line between the first expansion valve and the evaporator.

A first end of the first connection line may be connected to the refrigerant line between the sub-heat exchanger and the first expansion valve. A second end of the first connection line may be connected to the refrigerant line between the accumulator and the evaporator.

For cooling of the battery module by using the coolant having heat-exchanged at the chiller, the second expansion valve may be configured to expand the refrigerant introduced through the first connection line and introduce the expanded refrigerant to the chiller.

For heating of the battery module, the first valve opens the second connection line such that the refrigerant supplied from the compressor is introduced to the chiller, and the second valve opens the fourth connection line such that the refrigerant having passed through the chiller is supplied to the internal condenser.

In the case of the cooling mode of the vehicle interior, the third expansion valve may be configured to allow the refrigerant supplied from the internal condenser to flow through the refrigerant line in an unexpanded state.

In the case of the heating mode or the heating and dehumidifying mode of the vehicle interior, the fifth connection line may be opened by an operation of the third valve and the sixth connection line may be opened by an operation of the fourth valve.

The seventh connection line may be opened by an operation of the fourth valve in the case of the heating mode of the vehicle interior and closed by the operation of the fourth valve in the case of the heating and dehumidifying mode of the vehicle interior.

The main heat exchanger may be connected to a second cooling device including an electrical component and a second line through which the coolant circulates, through the second line. The main heat exchanger may be configured to condense or evaporate an interiorly introduced refrigerant through heat exchange with the coolant supplied from the second cooling device according to a selective operation of the third expansion valve.

According to a heat pump system of a vehicle according to an embodiment, the temperature of the battery module is adjusted according to the vehicle mode by using a single chiller at which the coolant and the refrigerant are heat-exchanged, and accordingly the system may be streamlined and simplified.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, the temperature of the battery module may be efficiently increased by using the coolant heated while passing through the chiller through the selective operation of the air conditioner unit, and the usage of a separate electric heater may be minimized, thereby reducing unnecessary electric power consumption.

In addition, according to an embodiment, the main heat exchanger that condenses or evaporates the refrigerant by using the coolant and the sub-heat exchanger that condenses or evaporates the refrigerant through heat exchange with the ambient air are applied to increase the performance of condensing or evaporating the refrigerant, and thereby the cooling performance may be improved while reducing the power consumption of the compressor.

In addition, according to an embodiment, it is possible to reduce manufacturing cost and weight through simplification of an entire system and to improve space utilization.

Figure 1:
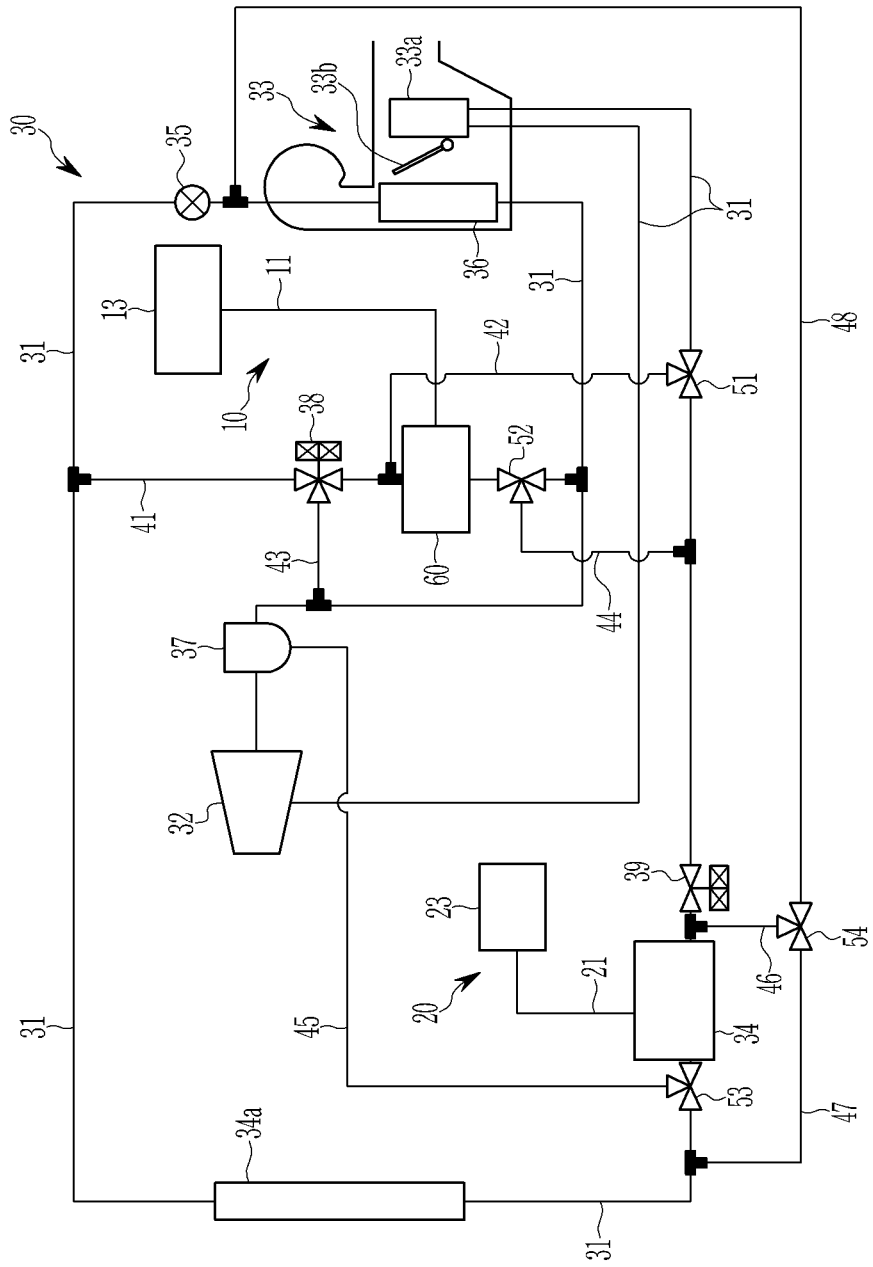
FIG. 1 is a block diagram of a heat pump system of a vehicle according to an embodiment.

The following reference identifiers may be used in connection with the accompanying drawings to describe exemplary embodiments of the present disclosure.

10, 110: first cooling device
    20, 120: second cooling device
    11, 111: first line
    21, 121: second line
    13, 113: battery module
    23, 123: electrical component
    30, 130: air conditioner unit
    31, 131: refrigerant line
    32, 132: compressor
    33, 133: HVAC module
    34, 134: main heat exchanger
    34a, 134a: sub-heat exchanger
    35, 135: first expansion valve
    37, 137: accumulator
    38, 138: second expansion valve
    39, 139: third expansion valve
    41, 141: first connection line
    42, 142: second connection line
    43, 143: third connection line
    44, 144: fourth connection line
    45, 145: fifth connection line
    46, 146: sixth connection line
    47, 147: seventh connection line
    48, 148: dehumidification line
    51, 151: first valve 52, 152: second valve
53, 153: third valve
54, 154: fourth valve

DETAILED DESCRIPTION OF ILLUSTRATIVE EMBODIMENTS

Exemplary embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc. are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms such as " . . . unit", " . . . means", " . . . portions", " . . . part", and " . . . member" described in the specification mean a unit of a comprehensive element that performs at least one function or operation.

FIG. 1 is a block diagram of a heat pump system of a vehicle according to an embodiment.

A heat pump system of a vehicle according to an embodiment may efficiently adjust the temperature of a battery module 13 and improve performance and efficiency of heating the battery module 13 by using a chiller 60 providing heat-exchange between the refrigerant and the coolant.

Here, in the heat pump system, e.g., in an electric vehicle, first and second cooling devices 10 and 20 for supplying the coolant to the battery module 13 and an electrical component 23 may be interconnected with an air conditioner unit 30 that is an air-conditioner apparatus for cooling and heating a vehicle interior.

That is, referring to FIG. 1, the heat pump system may include the first cooling device 10, the second cooling device 20, the air conditioner unit 30, and the chiller 60.

First, the first cooling device 10 may include the battery module 13 and a first line 11 through which the coolant circulates. The battery module 13 may be connected to the first line 11 such that the coolant may flow through the battery module 13.

Accordingly, the battery module 13 may be water-cooled by being connected to the first line 11.

The second cooling device 20 may include the electrical component 23 and a second line 21 through which the coolant circulates. The electrical component 23 may be connected to the second line 21 such that the coolant may flow through the electrical component 23.

The electrical component 23 may include an autonomous driving controller and power conversion device such as an electric power control unit (EPCU), a motor, an inverter, or an on-board charger (OBC), and the like.

The electrical component 23 may be water-cooled by being connected to the second line 21.

Here, the first and second cooling devices 10 and 20 may include a radiator, a water pump, a reservoir tank, and the like (not shown).

That is, the first and second cooling devices 10 and 20 circulate the coolant along the first and second lines 11 and 21 by the operation of the water pump, respectively, and may thereby adjust the temperature of the battery module 13 or the electrical component 23.

In the present embodiment, the air conditioner unit 30 includes a compressor 32, a HVAC (heating, ventilation, and air conditioning) module 33, a main heat exchanger 34, a sub-heat exchanger 34a, a first expansion valve 35, an evaporator 36, and an accumulator 37 that are interconnected through a refrigerant line 31 to circulate the refrigerant through the refrigerant line 31.

First, the HVAC module 33 is internally provided with the evaporator 36 and an opening/closing door 33b, where the evaporator 36 is connected to the refrigerant line 31, and the opening/closing door 33b is configured to adjust selective flowing of the ambient air having passed through the evaporator 36 to an internal condenser 33a according to a cooling mode, a heating mode, and a heating and dehumidifying mode of the vehicle interior.

That is, in the heating mode or the heating and dehumidifying mode of the vehicle interior, the opening/closing door 33b is opened such that the ambient air having passed through the evaporator 36 is introduced to the internal condenser 33a.

To the contrary, in the cooling mode of the vehicle interior, the opening/closing door 33b closes a side to the internal condenser 33a such that the ambient air cooled while passing through the evaporator 36 may be directly introduced to the vehicle interior.

The internal condenser 33a may condense the refrigerant supplied from the compressor 32 through heat exchange with ambient air.

In the present embodiment, the main heat exchanger 34 is connected to the refrigerant line 31 to allow the refrigerant to pass through. The main heat exchanger 34 may be connected to the second cooling device 20 through the second line 21 such that coolant is supplied from the second cooling device 20.

That is, the main heat exchanger 34 may condense or evaporate the refrigerant by heat-exchange with the coolant supplied through the second line 21. The main heat exchanger 34 may be a water-cooled heat exchanger through which the coolant may flow.

In the present embodiment, the sub-heat exchanger 34a may be provided on the refrigerant line 31 between the main heat exchanger 34 and the evaporator 36.

The sub-heat exchanger 34a may additionally condense or evaporate the refrigerant condensed or evaporated at the main heat exchanger 34 through heat exchange with the ambient air.

The first expansion valve 35 is provided on the refrigerant line 31 between the sub-heat exchanger 34a and the evaporator 36. The first expansion valve 35 receives and expands the refrigerant having passed through the sub-heat exchanger 34a.

The accumulator 37 is provided on the refrigerant line 31 between the evaporator 36 and the compressor 32.

The accumulator 37 only supplies the refrigerant in the gas state to the compressor 32, and thereby efficiency and durability of the compressor 32 are improved.

The compressor 32 is connected between the evaporator 36 and the internal condenser 33a through the refrigerant line 31. The compressor 32 may compress the refrigerant in the gas state and supply the compressed refrigerant to the internal condenser 33a.

In the present embodiment, the chiller 60 is connected to the first cooling device 10 through the first line 11, and the coolant may selectively circulate therethrough.

The chiller 60 is connected to the refrigerant line 31 through a first connection line 41. That is, the chiller 60 may be a water-cooled heat exchanger through which the coolant may flow.

Accordingly, the chiller 60 may adjust the coolant temperature through heat-exchanging the coolant selectively introduced through the first line 11 with the refrigerant selectively supplied from the air conditioner unit 30.

The coolant having heat-exchanged at the chiller 60 may circulate the battery module 13 through the first line 11.

In the present embodiment, the air conditioner unit 30 may further include a second expansion valve 38, a third expansion valve 39, the first connection line 41, a second connection line 42, a third connection line 43, a fourth connection line 44, a fifth connection line 45, a sixth connection line 46, a seventh connection line 47, a dehumidification line 48, a first valve 51, a second valve 52, a third valve 53, and a fourth valve 54.

First, the second expansion valve 38 is provided on the first connection line 41 upstream of the chiller 60.

Here, a first end of the first connection line 41 is connected to the refrigerant line 31 between the sub-heat exchanger 34a and the first expansion valve 35. In addition, a second end of the first connection line 41 may be connected to the refrigerant line 31 between the evaporator 36 and the accumulator 37.

Meanwhile, according to the cooling mode, the heating mode, or the heating and dehumidifying mode of the vehicle interior, the second expansion valve 38 may selectively expand the refrigerant having passed through the sub-heat exchanger 34a and introduce the expanded refrigerant through the first connection line 41, or the second expansion valve 38 may pass the refrigerant to the first connection line 41 without expansion.

In more detail, for cooling of the battery module 13 by using the coolant having heat-exchanged with the refrigerant at the chiller 60, the second expansion valve 38 may expand the refrigerant introduced through the first connection line 41 and introduce the expanded refrigerant to the chiller 60.

That is, the second expansion valve 38 decreases the temperature by expanding the refrigerant discharged from the sub-heat exchanger 34a and introduces the refrigerant of the decreased temperature to the chiller 60, thereby further decreasing the temperature of the coolant passing through the chiller 60.

Accordingly, the battery module 13 receives the coolant with the further decreased temperature by the chiller 60 and may be more efficiently cooled.

In the present embodiment, the third expansion valve 39 may be provided on the refrigerant line 31 between the first valve 51 and the main heat exchanger 34.

Here, in the case of the cooling mode of the vehicle interior, the third expansion valve 39 may introduce the refrigerant supplied from the internal condenser 33a to the refrigerant line 31 without the expansion.

To the contrary, in the heating mode or the heating and dehumidifying mode of the vehicle interior, the third expansion valve 39 may expand the refrigerant introduced through the refrigerant line 31 and supply the expanded refrigerant to the main heat exchanger 34.

Accordingly, in the heating mode or the heating and dehumidifying mode of the vehicle interior, the main heat exchanger 34 may evaporate the refrigerant through heat-exchanging with the coolant supplied through the second line 21.

That is, according to a selective operation of the third expansion valve 39, the main heat exchanger 34 may condense or evaporate an interiorly introduced refrigerant through heat exchange with the coolant supplied from the second cooling device 20.

In the case that the main heat exchanger 34 condenses the refrigerant, since the main heat exchanger 34 further condenses the refrigerant condensed at the internal condenser 33a and the sub-heat exchanger 34a additionally condenses the refrigerant, sub-cooling of the refrigerant may be increased, thereby improving the coefficient of performance (COP), which is the ratio of cooling capacity with respect to required compressor power.

Accordingly, in the cooling mode of the vehicle, the pressure of the refrigerant circulating along the refrigerant line 31 is reduced, thereby improving cooling performance.

In the present embodiment, the first valve 51 may be provided on the refrigerant line 31 between the internal condenser 33a and the main heat exchanger 34. In more detail, the first valve 51 is disposed on the refrigerant line 31 between the internal condenser 33a and the third expansion valve 39.

The second valve 52 may be provided on the first connection line 41 at a rear end of the chiller 60.

Here, a first end of the second connection line 42 is connected to the first valve 51. A second end of the second connection line 42 may be connected to the first connection line 41 between the chiller 60 and the second expansion valve 38.

A first end of the third connection line 43 may be connected to the second expansion valve 38. A second end of the third connection line 43 may be connected to the refrigerant line 31 between the evaporator 36 and the compressor 32.

In the present embodiment, a first end of the fourth connection line 44 may be connected to the second valve 52. A second end of the fourth connection line 44 may be connected to the refrigerant line 31 between the main heat exchanger 34 and the first valve 51.

Here, for heating of the battery module 13, the second connection line 42 and the fourth connection line 44 may be opened by the operation of the first valve 51 and the second valve 52.

In this case, the first valve 51 may close a portion of the refrigerant line 31 connecting the second end of the fourth connection line 44 and the first valve 51. Simultaneously, the second valve 52 may close a portion of the first connection line 41 connecting the second valve 52 and the refrigerant line 31.

That is, for heating of the battery module 13, the first valve 51 may open the second connection line 42 such that the refrigerant supplied from the internal condenser 33a is introduced to the chiller 60.

In addition, the second valve 52 may open the fourth connection line 44 such that the refrigerant having passed through the chiller 60 is supplied to the main heat exchanger 34.

In the present embodiment, a first end of the fifth connection line 45 may be connected to the third valve 53 provided to the refrigerant line 31 between the main heat exchanger 34 and the sub-heat exchanger 34a. A second end of the fifth connection line 45 may be connected to the accumulator 37.

That is, the fifth connection line 45 may selectively introduce the refrigerant discharged from the main heat exchanger 34 directly to the accumulator 37 by the operation of the third valve 53.

Here, in the heating mode or the heating and dehumidifying mode of the vehicle interior, the third valve 53 may open the fifth connection line 45 and may close the refrigerant line 31 connected to the sub-heat exchanger 34a.

To the contrary, in the cooling mode of the vehicle interior, the third valve 53 may close the fifth connection line 45 and may open the refrigerant line 31 connected to the sub-heat exchanger 34a.

In the present embodiment, a first end of the sixth connection line 46 may be connected to the refrigerant line 31 between the main heat exchanger 34 and the third expansion valve 39. A second end of the sixth connection line 46 may be connected to the fourth valve 54.

Here, in the heating mode or the heating and dehumidifying mode of the vehicle interior, the sixth connection line 46 may be selectively opened and closed by the operation of the fourth valve 54.

In other words, in the case of the heating mode or the heating and dehumidifying mode of the vehicle interior, the fifth connection line 45 may be opened by the operation of the third valve 53. In addition, the sixth connection line 56 may be opened by the operation of the fourth valve 54.

A first end of the seventh connection line 47 may be connected to the fourth valve 54. A second end of the seventh connection line 47 may be connected to the refrigerant line 31 between the sub-heat exchanger 34a and the third valve 53.

In the heating mode of the vehicle interior, the seventh connection line 47 may be selectively opened by the operation of the fourth valve 54.

That is, the seventh connection line 47 may provide a portion of the refrigerant supplied to the main heat exchanger 34 with a bypass to the sub-heat exchanger 34a.

To the contrary, in the case of the heating and dehumidifying mode of the vehicle interior, the seventh connection line 47 may be closed by the operation of the fourth valve 54.

In addition, a first end of the dehumidification line 48 may be connected to the fourth valve 54. A second end of the dehumidification line 48 may be connected to the refrigerant line 31 between the first expansion valve 35 and the evaporator 36.

Here, in the heating and dehumidifying mode of the vehicle interior, the dehumidification line 48 may be opened by the operation of the fourth valve 54.

In the present embodiment, the first expansion valve 35 may be a mechanical expansion valve, and the second expansion valve 38 may be a 3-way electronic expansion valve capable of selectively expanding the refrigerant while controlling flowing of the refrigerant passing through the first connection line 141.

In addition, the third expansion valve 39 may be a 2-way electronic expansion valve capable of selectively expanding the refrigerant while controlling flowing of the refrigerant passing through the refrigerant line 31.

Meanwhile, the first, second, third, and fourth valves 51, 52, 53, and 54 each may be a 3-way valve capable of controlling flowing of the refrigerant and distributing flow rates of the refrigerant.

Hereinafter, operation and action of a heat pump system of a vehicle according to an embodiment configured as described above is described in detail with reference to FIG. 2 to FIG. 4.

First, the operation for cooling the battery module 13 in the cooling mode of the vehicle interior is described with reference to FIG. 2.

Figure 2:
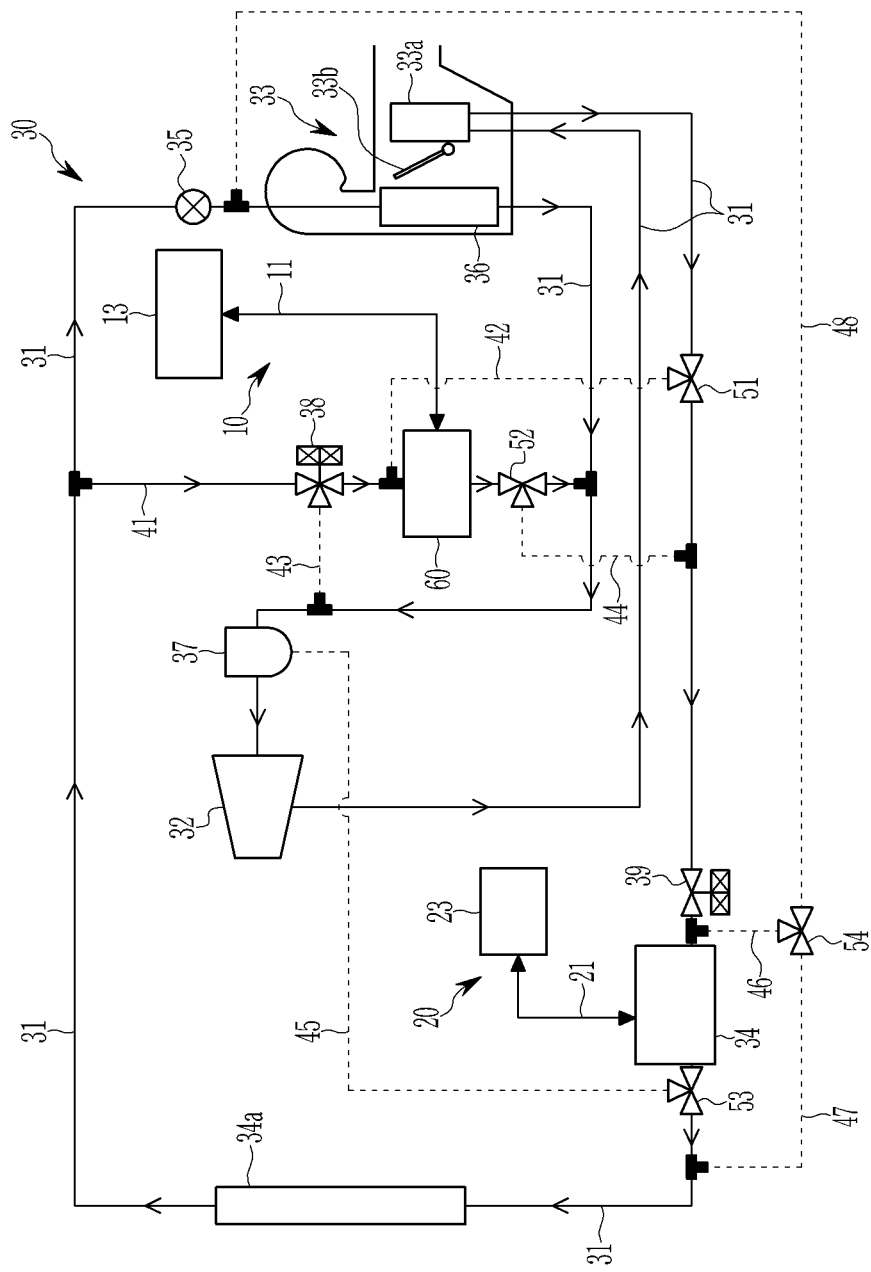
FIG. 2 is an operation diagram for cooling a battery module in a cooling mode of a vehicle interior in a heat pump system of a vehicle according to an embodiment.

FIG. 2 is an operation diagram for cooling a battery module in the cooling mode of the vehicle interior in a heat pump system of a vehicle according to an embodiment.

Referring to FIG. 2, the first and second cooling devices 10 and 20 supply the coolant to the main heat exchanger 34 and the chiller 60 through the first and second lines 11 and 21 respectively connected to the main heat exchanger 34 and the chiller 60.

In the air conditioner unit 30, corresponding components operate in order to cool the vehicle interior. Accordingly, the refrigerant circulates along the refrigerant line 31.

Here, the refrigerant line 31 connecting the sub-heat exchanger 34a and the evaporator 36 is opened by the operation of the first expansion valve 35. The first connection line 41 is opened by the operation of the second expansion valve 38.

In addition, the third expansion valve 39 may supply the refrigerant supplied from the internal condenser 33a to the main heat exchanger 34 in an unexpanded state.

In addition, the second connection line 42 is closed by the operation of the first valve 51. Simultaneously, the fourth connection line 44 is closed by the operation of the second valve 52.

At this time, the second valve 52 may operate such that the first connection line 41 may be connected to the refrigerant line 31 between the evaporator 36 and the accumulator 37.

Meanwhile, the third connection line 43 is closed by the operation of the second expansion valve 38.

The fifth connection line 45 is closed by the operation of the third valve 53. In addition, the third valve 53 may open the refrigerant line 31 connected to the sub-heat exchanger 34a such that the main heat exchanger 34 is connected to the sub-heat exchanger 34a.

In addition, the sixth connection line 46, the seventh connection line 47, and the dehumidification line 48 are closed by the operation of the fourth valve 54.

Then, the refrigerant having passed through the sub-heat exchanger 34a may circulate along the refrigerant line 31 and the first connection line 41.

Here, the first and second expansion valves 35 and 38 may expand the refrigerant such that the expanded refrigerant is respectively supplied to the evaporator 36 and the chiller 60.

In addition, the sub-heat exchanger 34a may additionally condense the refrigerant introduced from the main heat exchanger 34 through heat exchange with the ambient air.

In addition, the main heat exchanger 34 condenses the refrigerant by using the coolant flowing through the second line 21.

Meanwhile, the coolant having passed through the chiller 60 is cooled through heat exchange with the expanded refrigerant supplied to the chiller 60.

Meanwhile, the coolant having passed through the chiller 60 may cool the battery module 13 provided in the first cooling device 10.

That is, the coolant passing through the chiller 60 is cooled through heat exchange with the expanded refrigerant supplied to the chiller 60.

The coolant cooled at the chiller 60 is supplied to the battery module 13 along the first line 11. Accordingly, the battery module 13 may be efficiently cooled by the coolant cooled at the chiller 60.

That is, the second expansion valve 38 expands a portion of the refrigerant having passed through the sub-heat exchanger 34a to supply the expanded refrigerant to the chiller 60.

Therefore, a portion of the refrigerant discharged at the sub-heat exchanger 34a is converted to a state of low temperature and low pressure by being expanded by the operation of the second expansion valve 38 and flows to the chiller 60 provided on the first connection line 41.

Then, the refrigerant introduced to the chiller 60 heat-exchanges with the coolant and flows to the compressor 32 after passing through the accumulator 37 through the refrigerant line 31 connected to the first connection line 41.

Meanwhile, the remaining refrigerant discharged at the sub-heat exchanger 34a flows through the refrigerant line 31 to cool the vehicle interior and sequentially passes through the first expansion valve 35, the evaporator 36, the accumulator 37, the compressor 32, the internal condenser 33a, and the main heat exchanger 34.

Here, the ambient air introduced to the HVAC module 33 is cooled by the refrigerant in a low temperature state introduced to the evaporator 36 while passing through the evaporator 36.

At this time, the opening/closing door 33b closes the region passing through the internal condenser 33a such that the cooled ambient air does not pass through the internal condenser 33a. Therefore, the cooled ambient air directly flows into the vehicle interior to cool the vehicle interior.

Meanwhile, the refrigerant is expanded and supplied to the evaporator 36 with its condensation being increased while sequentially passing through the main heat exchanger 34 and the sub-heat exchanger 34a, and thereby the refrigerant may be evaporated at a lower temperature.

That is, in the present embodiment, since the main heat exchanger 34 condenses the refrigerant through heat exchange with the coolant, and the sub-heat exchanger 34a additionally condenses the refrigerant through heat exchange with the ambient air, it may be beneficial to forming sub-cooling of the refrigerant.

In addition, as the refrigerant formed with sub-cooling is evaporated to a lower temperature at the evaporator 36, the temperature of the ambient air passing through the evaporator 36 may be further lowered, thereby improving the cooling performance and efficiency.

In the cooling mode of the vehicle interior, the refrigerant may cool the vehicle interior while repeating the above-described processes, and at the same time, may cool the coolant through the heat exchange while passing through the chiller 60.

The coolant of a low temperature cooled at the chiller 60 flows to the battery module 13 through the first line 11. Accordingly, the battery module 13 may be efficiently cooled by the supplied low temperature coolant.

In the present embodiment, the operation for heating the battery module 13 in the heating mode of the vehicle interior is described with reference to FIG. 3.

Figure 3:
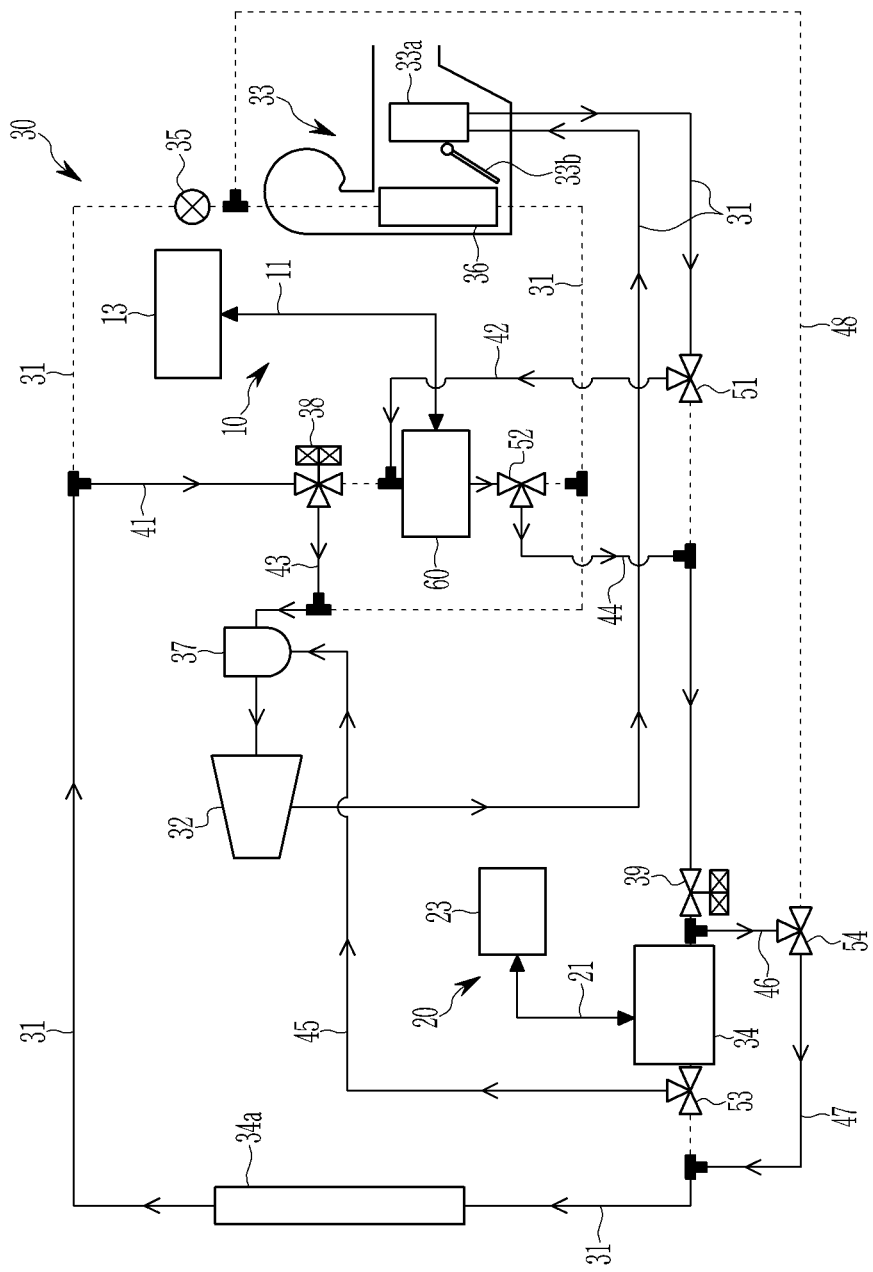
FIG. 3 is an operation diagram for heating a battery module in a heating mode of a vehicle interior in a heat pump system of a vehicle according to an embodiment.

FIG. 3 is an operation diagram for heating a battery module in the heating mode of the vehicle interior in a heat pump system of a vehicle according to an embodiment.

Referring to FIG. 3, the first and second cooling devices 10 and 20 supply the coolant to the main heat exchanger 34 and the chiller 60 through the first and second lines 11 and 21 respectively connected to the main heat exchanger 34 and the chiller 60.

In the air conditioner unit 30, corresponding components operate in order to heat the vehicle interior. Accordingly, the refrigerant circulates along the refrigerant line 31.

Here, the refrigerant line 31 connecting the sub-heat exchanger 34a and the evaporator 36 is closed by the operation of the first expansion valve 35.

In addition, a portion of the first connection line 41 connecting the chiller 60 and the second expansion valve 38 is closed by the operation of the second expansion valve 38.

At this time, the third connection line 43 is opened by the operation of the second expansion valve 38.

Accordingly, the refrigerant discharged from the sub-heat exchanger 34a flows to the second expansion valve 38 along the refrigerant line 31 and the portion of the first connection line 41.

The second expansion valve 38 may discharge the introduced refrigerant to the third connection line 43 in an unexpanded state.

The refrigerant discharged through the third connection line 43 may flow to the accumulator 37 along the refrigerant line 31.

Meanwhile, the second connection line 42 is opened by the operation of the first valve 51. Here, the first valve 51 may close a portion of the refrigerant line 31 connected to the second end of the fourth connection line 44.

Simultaneously, the fourth connection line 44 is opened by the operation of the second valve 52. At this time, the second valve 52 may operate such that a portion of the first connection line 41 connected to the chiller 60 is connected to the fourth connection line 44.

The fifth connection line 45 is opened by the operation of the third valve 53. In addition, the third valve 53 may close a portion of the refrigerant line 31 connected to the sub-heat exchanger 34a such that the main heat exchanger 34 is not connected to the sub-heat exchanger 34a.

In addition, the sixth connection line 46 and the seventh connection line 47 are opened by the operation of the fourth valve 54. At this time, the dehumidification line 48 is closed by the operation of the fourth valve 54.

In addition, the third expansion valve 39 may supply the refrigerant supplied from the chiller 60 to the main heat exchanger 34 in an expanded state.

Accordingly, the main heat exchanger 34 may evaporate the expanded refrigerant through heat exchange with the coolant.

The refrigerant evaporated at the main heat exchanger 34 is supplied to the accumulator 37 along the fifth connection line 45.

The refrigerant supplied to the accumulator 37 is separated into gas and liquid. The gas refrigerant among the separated gas and liquid refrigerants is supplied to the compressor 32.

The refrigerant compressed to the state of high temperature and high pressure at the compressor 32 flows to the internal condenser 33a.

Here, the refrigerant supplied to the internal condenser 33a may increase the temperature of the ambient air introduced to the HVAC module 33.

The opening/closing door 33b is opened such that the ambient air introduced to the HVAC module 33 and having passed through the evaporator 36 passes through the internal condenser 33a.

Accordingly, the ambient air introduced from outside is introduced in the state of the room temperature without being cooled, for passing through the evaporator 36 that is not supplied with the refrigerant. The introduced ambient air may be converted into a high temperature state while passing through the internal condenser 33a and flow into the vehicle interior, thereby realizing heating of the vehicle interior.

Meanwhile, the refrigerant having passed through the internal condenser 33a flows into the chiller 60 along the refrigerant line 31 and the opened second connection line 42.

The refrigerant introduced to the chiller 60 may heat-exchange with the coolant supplied from the first cooling device 10. Here, the coolant may be heated through heat exchange with the refrigerant in the high temperature state.

The heated coolant is supplied to the battery module 13 along the first line 11 and may efficiently increase the temperature of the battery module 13.

Meanwhile, the refrigerant having passed through the chiller 60 may flow sequentially through the portion of the first connection line 41, the second valve 52, and the fourth connection line 44.

Then, the refrigerant flowing through the fourth connection line 44 flows to the main heat exchanger 34 along the refrigerant line 31 that is opened by the operation of the third expansion valve 39.

At this time, the third expansion valve 39 may expand the refrigerant supplied from the chiller 60.

A portion of the refrigerant expanded at the third expansion valve 39 may be evaporated at the main heat exchanger 34 through heat exchange with the coolant supplied from the second cooling device 20.

The refrigerant evaporated at the main heat exchanger 34 flows to the accumulator 37 along the fifth connection line 45 and may flow as described above.

Meanwhile, the remaining refrigerant expanded at the third expansion valve 39 may flow along the sixth connection line 46 and the seventh connection line 47 that are open and may flow to the sub-heat exchanger 34a along the refrigerant line 31 connected to the seventh connection line 47.

Here, the sub-heat exchanger 34a may additionally evaporate the introduced refrigerant through heat exchange with the ambient air.

The refrigerant evaporated at the sub-heat exchanger 34a may, as described above, sequentially pass through the refrigerant line 31, the portion of the first connection line 41, and the second expansion valve 38, and then flow into the third connection line 43.

Therefore, while repeating the above-described processes, a heat pump system according to an embodiment may minimize the use of a separate electric heater for increasing the temperature of the battery module 13 and improve the heating efficiency and performance.

In the present embodiment, the operation in the heating and dehumidifying mode of the vehicle interior is described with reference to FIG. 4.

Figure 4:
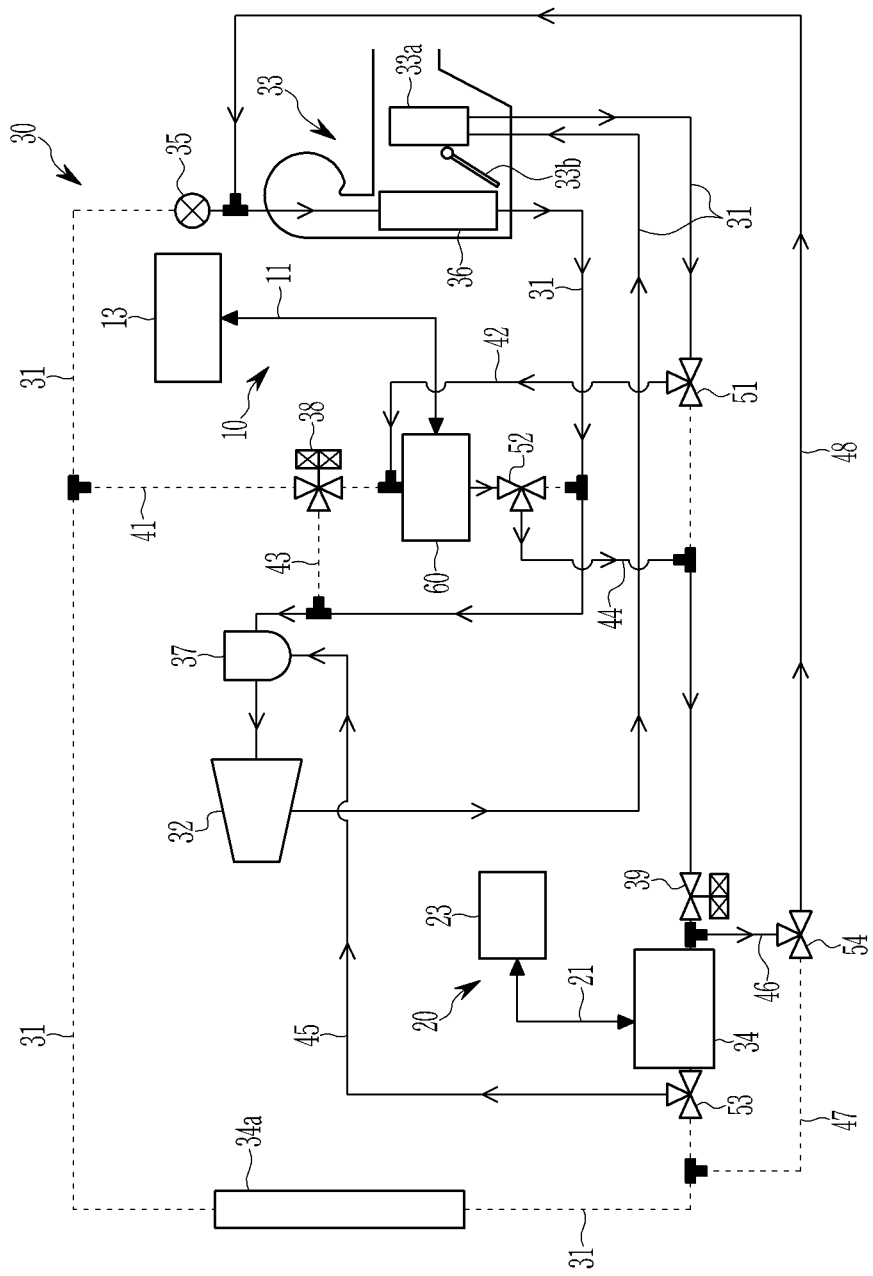
FIG. 4 is an operation diagram for heating a battery module in a heating and dehumidifying mode of a vehicle interior in a heat pump system of a vehicle according to an embodiment.

FIG. 4 is an operation diagram for heating a battery module in the heating and dehumidifying mode of the vehicle interior in a heat pump system of a vehicle according to an embodiment.

Referring to FIG. 4, the first and second cooling devices 10 and 20 supply the coolant to the main heat exchanger 34 and the chiller 60 through the first and second lines 11 and 21 respectively connected to the main heat exchanger 34 and the chiller 60.

In the air conditioner unit 30, corresponding components operate in order to heat and dehumidify the vehicle interior. Accordingly, the refrigerant circulates along the refrigerant line 31.

Here, the refrigerant line 31 connecting the sub-heat exchanger 34a and the evaporator 36 is closed by the operation of the first expansion valve 35.

In addition, the first connection line 41 connecting the sub-heat exchanger 34a and the chiller 60 is closed by the operation of the second expansion valve 38.

At this time, the third connection line 43 is closed by the operation of the second expansion valve 38.

Meanwhile, the second connection line 42 is opened by the operation of the first valve 51. Here, the first valve 51 may close the portion of the refrigerant line 31 connected to the second end of the fourth connection line 44.

Simultaneously, the fourth connection line 44 is opened by the operation of the second valve 52. At this time, the second valve 52 may operate such that the portion of the first connection line 41 connected to the chiller 60 is connected to the fourth connection line 44.

The fifth connection line 45 is opened by the operation of the third valve 53. In addition, the third valve 53 may close the portion of the refrigerant line 31 connected to the sub-heat exchanger 34a such that the main heat exchanger 34 is not connected to the sub-heat exchanger 34a.

In addition, the sixth connection line 46 and the dehumidification line 48 are opened by the operation of the fourth valve 54. At this time, the seventh connection line 47 is closed by the operation of the fourth valve 54.

Here, the third expansion valve 39 may supply the refrigerant supplied from the chiller 60 to the main heat exchanger 34 in an expanded state.

Accordingly, the main heat exchanger 34 may evaporate the expanded refrigerant through heat exchange with the coolant.

Meanwhile, the sixth connection line 46 and the dehumidification line 48 may be opened by the operation of the fourth valve 54 such that a portion of the expanded refrigerant is supplied to the evaporator 36 by the operation of the third expansion valve 39.

Accordingly, the portion of the refrigerant expanded at the third expansion valve 39 may flow into the evaporator 66 through the opened sixth connection line 46 and the dehumidification line 48.

The refrigerant evaporated at the main heat exchanger 34 is supplied to the accumulator 37 along the fifth connection line 45.

The refrigerant supplied to the accumulator 37 is separated into gas and liquid. The gas refrigerant among the separated gas and liquid refrigerants is supplied to the compressor 32.

The refrigerant compressed to the state of high temperature and high pressure at the compressor 32 flows to the internal condenser 33a.

Here, the refrigerant supplied to the internal condenser 33a may increase temperature of the ambient air introduced to the HVAC module 33.

The opening/closing door 33b is opened such that the ambient air introduced to the HVAC module 33 and having passed through the evaporator 36 passes through the internal condenser 33a.

That is, the ambient air introduced to the HVAC module 33 is dehumidified while passing through the evaporator 36 by the refrigerant in the low temperature state introduced to the evaporator 36. Then, the introduced ambient air may be converted into the high temperature state while passing through the internal condenser 33a and flow into the vehicle interior, thereby heating and dehumidifying the vehicle interior smoothly.

Meanwhile, the refrigerant having passed through the internal condenser 33a flows into the chiller 60 along the refrigerant line 31 and the opened second connection line 42.

The refrigerant introduced to the chiller 60 may heat-exchange with the coolant supplied from the first cooling device 10. Here, the coolant may be heated through heat exchange with the refrigerant in the high temperature state.

The heated coolant is supplied to the battery module 13 along the first line 11 and may efficiently increase the temperature of the battery module 13.

Meanwhile, the refrigerant having passed through the chiller 60 may flow sequentially through the portion of the first connection line 41, the second valve 52, and the fourth connection line 44.

Then, the refrigerant flowing through the fourth connection line 44 flows to the main heat exchanger 34 along the refrigerant line 31 that is opened by the operation of the third expansion valve 39.

At this time, the third expansion valve 39 may expand the refrigerant supplied from the chiller 60.

The portion of the refrigerant expanded at the third expansion valve 39 may be evaporated at the main heat exchanger 34 through heat exchange with the coolant supplied from the second cooling device 20.

The refrigerant evaporated at the main heat exchanger 34 flows to the accumulator 37 along the fifth connection line 45 and may flow as described above.

Meanwhile, the remaining refrigerant expanded at the third expansion valve 39 may flow along the sixth connection line 46 and the dehumidification line 48 that are open and may flow to the evaporator 36 along the refrigerant line 31 connected to the dehumidification line 48.

The refrigerant evaporated at the evaporator 36 may, as described above, flow into the compressor 32 after passing through the accumulator 37 along the refrigerant line 31.

Therefore, according to a heat pump system according to an embodiment, while repeating the above-described processes, the use of a separate electric heater for increasing the temperature of the battery module 13 may be minimized thereby improving the heating efficiency and performance, and at the same time, the vehicle interior may be dehumidified.

According to a heat pump system of a vehicle according to an embodiment, the temperature of the battery module 13 is adjusted according to the vehicle mode by using a single chiller 60 at which the coolant and the refrigerant are heat-exchanged, and accordingly the system may be streamlined and simplified.

In addition, according to an embodiment, by efficiently adjusting the temperature of the battery module 13, the optimal performance of the battery module 13 may be enabled, and the overall travel distance of the vehicle may be increased due to the efficient management of the battery module 13.

In addition, according to an embodiment, the temperature of the battery module 13 may be efficiently increased by using the coolant heated while passing through the chiller 60 through the selective operation of the air conditioner unit 30, and the usage of a separate electric heater may be minimized, thereby reducing unnecessary electric power consumption.

In addition, according to an embodiment, the main heat exchanger 34 that condenses or evaporates the refrigerant by using the coolant and the sub-heat exchanger 34a that condenses or evaporates the refrigerant through heat exchange with the ambient air are applied to increase the performance of condensing or evaporating the refrigerant, and thereby the cooling performance may be improved while reducing the power consumption of the compressor.

In addition, according to an embodiment, it is possible to reduce manufacturing cost and weight through simplification of an entire system and to improve space utilization.

Meanwhile, a heat pump system of a vehicle according to another embodiment is described with reference to FIG. 5.

Figure 5:
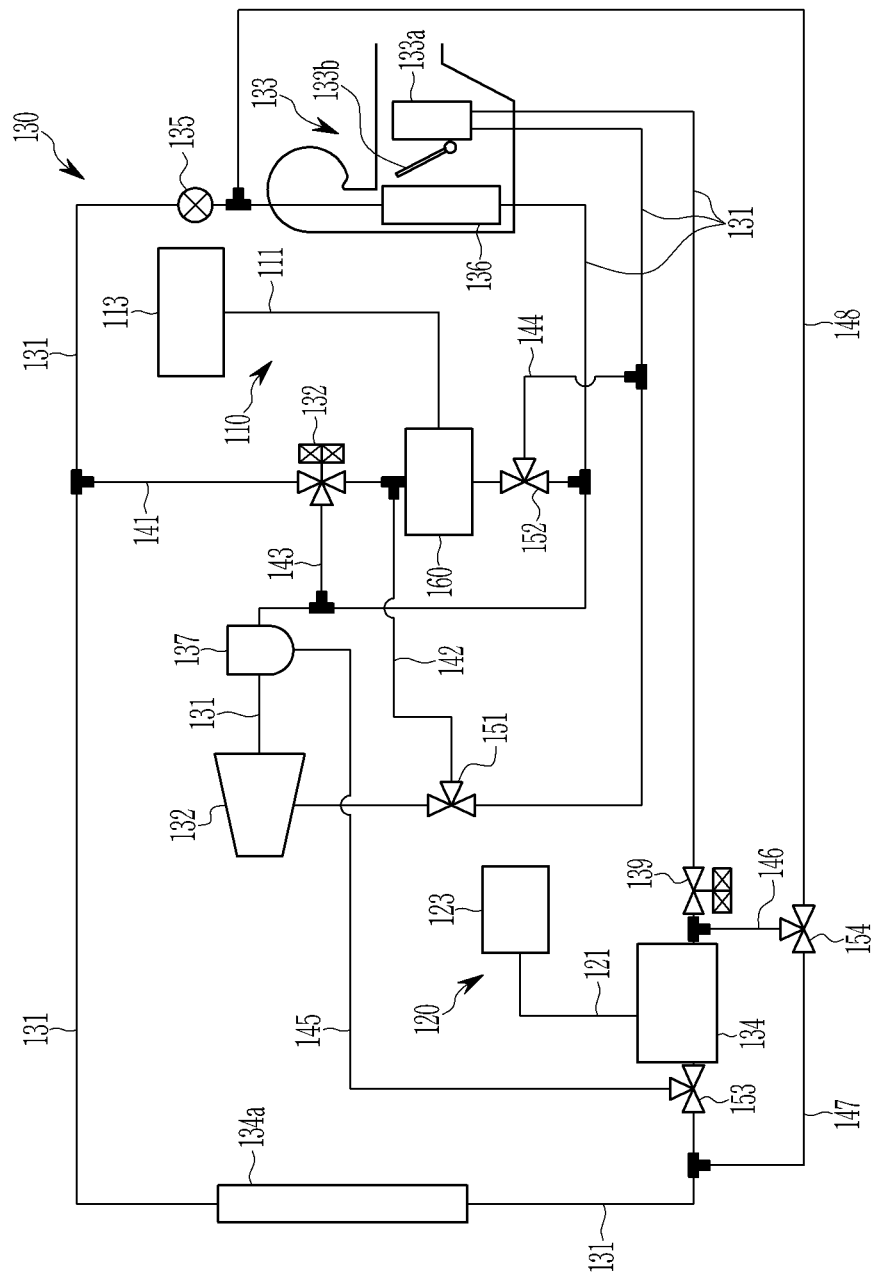
FIG. 5 is a block diagram of a heat pump system of a vehicle according to another embodiment.

FIG. 5 is a block diagram of a heat pump system of a vehicle according to another embodiment.

A heat pump system of a vehicle according to another embodiment may efficiently adjust the temperature of a battery module 113 and improve performance and efficiency of heating the battery module 113 by using a chiller 160 providing heat-exchange between the refrigerant and the coolant.

Here, in the heat pump system, e.g., in an electric vehicle, first and second cooling devices 110 and 120 for supplying the coolant to the battery module 113 and an electrical component 123 may be interconnected with an air conditioner unit 130 that is an air-conditioner apparatus for cooling and heating the vehicle interior.

That is, referring to FIG. 1, the heat pump system may include the first cooling device 110, the second cooling device 120, the air conditioner unit 130, and the chiller 160.

First, the first cooling device 110 may include the battery module 113 and a first line 111 through which the coolant circulates. The battery module 113 may be connected to the first line in such that the coolant may flow through the battery module 113.

Accordingly, the battery module 113 may be water-cooled by being connected to the first line 111.

The second cooling device 120 may include the electrical component 123 and a second line 121 through which the coolant circulates. The electrical component 123 may be connected to the second line 121 such that the coolant may flow through the electrical component 123.

The electrical component 123 may include an autonomous driving controller and power conversion device such as an electric power control unit (EPCU), a motor, an inverter, or an on-board charger (OBC), and the like.

The electrical component 123 may be water-cooled by being connected to the second line 121.

Here, the first and second cooling devices 110 and 120 may include a radiator, a water pump, a reservoir tank, and the like (not shown).

That is, the first and second cooling devices 110 and 120 circulate the coolant along the first and second lines 111 and 121 by the operation of the water pump, respectively, and may thereby adjust the temperature of the battery module 113 or the electrical component 123.

In the present embodiment, the air conditioner unit 130 includes a compressor 132, a HVAC (heating, ventilation, and air conditioning) module 133, a main heat exchanger 134, a sub-heat exchanger 134a, a first expansion valve 135, an evaporator 136, and an accumulator 137 that are interconnected through a refrigerant line 131 to circulate the refrigerant through the refrigerant line 131.

First, the HVAC module 133 is internally provided with the evaporator 136 and an opening/closing door 133b, where the evaporator 136 is connected to the refrigerant line 131, and the opening/closing door 33b is configured to adjust selective flowing of the ambient air having passed through the evaporator 136 to an internal condenser 133a according to the cooling mode, the heating mode, and the heating and dehumidifying mode of the vehicle interior.

That is, in the heating mode or the heating and dehumidifying mode of the vehicle interior, the opening/closing door 133*b* is opened such that the ambient air having passed through the evaporator 136 is introduced to the internal condenser 133*a*.

To the contrary, in the cooling mode of the vehicle interior, the opening/closing door 133*b* closes a side to the internal condenser 133*a* such that the ambient air cooled while passing through the evaporator 136 may be directly introduced to the vehicle interior.

The internal condenser 133*a* may condense the refrigerant supplied from the compressor 132 through heat exchange with ambient air.

In the present embodiment, the main heat exchanger 134 is connected to the refrigerant line 131 to allow the refrigerant to pass through. The main heat exchanger 134 may be connected to the second cooling device 120 through the second line 121 such that coolant is supplied from the second cooling device 120.

That is, the main heat exchanger 134 may condense or evaporate the refrigerant by heat-exchange with the coolant supplied through the second line 121. The main heat exchanger 134 may be a water-cooled heat exchanger through which the coolant may flow.

In the present embodiment, the sub-heat exchanger 134*a* may be provided on the refrigerant line 131 between the main heat exchanger 134 and the evaporator 136.

The sub-heat exchanger 134*a* may additionally condense or evaporate the refrigerant condensed or evaporated at the main heat exchanger 134 through heat exchange with the ambient air.

The first expansion valve 135 is provided on the refrigerant line 131 between the sub-heat exchanger 134*a* and the evaporator 136. The first expansion valve 135 receives and expands the refrigerant having passed through the sub-heat exchanger 134*a*.

The accumulator 137 is provided on the refrigerant line 131 between the evaporator 136 and the compressor 132.

The accumulator 137 only supplies the refrigerant in the gas state to the compressor 132, and thereby efficiency and durability of the compressor 132 are improved.

The compressor 132 is connected between the evaporator 136 and the internal condenser 133*a* through the refrigerant line 131. The compressor 132 may compress the refrigerant in the gas state and supply the compressed refrigerant to the internal condenser 133*a*.

In the present embodiment, the chiller 160 is connected to the first cooling device 110 through the first line 11, and the coolant may selectively circulate therethrough.

The chiller 160 is connected to the refrigerant line 131 through the first connection line 141. That is, the chiller 160 may be a water-cooled heat exchanger through which the coolant may flow.

Accordingly, the chiller 160 may adjust the coolant temperature through heat-exchanging the coolant selectively introduced through the first line 11 with the refrigerant selectively supplied from the air conditioner unit 130.

Coolant having heat-exchanged at the chiller 160 may circulate the battery module 113 through the first line 11.

In the present embodiment, the air conditioner unit 130 may further include a second expansion valve 138, a third expansion valve 139, the first connection line 141, a second connection line 142, a third connection line 143, a fourth connection line 144, a fifth connection line 145, a sixth connection line 146, a seventh connection line 147, a dehumidification line 148, a first valve 151, a second valve 152, a third valve 153, and a fourth valve 154.

First, the second expansion valve 138 is provided on the first connection line 141 upstream of the chiller 160.

Here, a first end of the first connection line 141 is connected to the refrigerant line 131 between the sub-heat exchanger 134*a* and the first expansion valve 135. In addition, a second end of the first connection line 141 may be connected to the refrigerant line 131 between the evaporator 136 and the accumulator 137.

Meanwhile, according to the cooling mode, the heating mode, or the heating and dehumidifying mode of the vehicle interior, the second expansion valve 138 may selectively expand the refrigerant having passed through the sub-heat exchanger 134*a* and introduce the expanded refrigerant through the first connection line 141 or may pass the refrigerant to the first connection line 141 without expansion.

In more detail, for cooling of the battery module 113 by using the coolant having heat-exchanged with the refrigerant at the chiller 160, the second expansion valve 138 may expand the refrigerant introduced through the first connection line 141 and introduce the expanded refrigerant to the chiller 160.

That is, the second expansion valve 138 decreases the temperature by expanding the refrigerant discharged from the sub-heat exchanger 134*a* and introduces the refrigerant of the decreased temperature to the chiller 160, thereby further decreasing the temperature of the coolant passing through the chiller 160.

Accordingly, the battery module 113 receives the coolant with the further decreased temperature by the chiller 160 and may be more efficiently cooled.

In the present embodiment, the third expansion valve 139 may be provided on the refrigerant line 131 between the first valve 151 and the main heat exchanger 134.

Here, in the case of the cooling mode of the vehicle interior, the third expansion valve 139 may introduce the refrigerant supplied from the internal condenser 133*a* to the refrigerant line 131 in an unexpanded state.

To the contrary, in the heating mode or the heating and dehumidifying mode of the vehicle interior, the third expansion valve 139 may expand the refrigerant introduced through the refrigerant line 131 and supply the expanded refrigerant to the main heat exchanger 134.

Accordingly, in the heating mode or the heating and dehumidifying mode of the vehicle interior, the main heat exchanger 134 may evaporate the refrigerant through heat-exchanging with the coolant supplied through the second line 121.

That is, according to a selective operation of the third expansion valve 139, the main heat exchanger 134 may condense or evaporate an interiorly introduced refrigerant through heat exchange with the coolant supplied from the second cooling device 120.

In the case that the main heat exchanger 134 condenses the refrigerant, since the main heat exchanger 134 further condenses the refrigerant condensed at the internal condenser 133*a* and the sub-heat exchanger 134*a* additionally condenses the refrigerant, sub-cooling of the refrigerant may be increased, thereby improving the coefficient of performance (COP), which is the ratio of cooling capacity with respect to required compressor power.

Accordingly, in the cooling mode of the vehicle, the pressure of the refrigerant circulating along the refrigerant line 131 is reduced, thereby improving cooling performance.

In the present embodiment, the first valve 151 may be provided on the refrigerant line 131 between the compressor 132 and the internal condenser 133a.

The second valve 152 may be provided on the first connection line 141 at a rear end of the chiller 160.

Here, a first end of the second connection line 142 is connected to the first valve 151. A second end of the second connection line 142 may be connected to the first connection line 141 between the chiller 160 and the second expansion valve 138.

A first end of the third connection line 143 may be connected to the second expansion valve 138. A second end of the third connection line 143 may be connected to the refrigerant line 131 between the evaporator 136 and the compressor 132.

In the present embodiment, a first end of the fourth connection line 144 may be connected to the second valve 152. A second end of the fourth connection line 144 may be connected to the refrigerant line 131 between the compressor 132 and the internal condenser 133a.

Here, for heating of the battery module 113, the second connection line 142 and the fourth connection line 144 may be opened by the operation of the first valve 151 and the second valve 152.

In this case, the first valve 151 may close a portion of the refrigerant line 131 connecting the second end of the fourth connection line 144 and the first valve 151. Simultaneously, the second valve 152 may close a portion of the first connection line 141 connecting the second valve 152 and the refrigerant line 131.

That is, for heating of the battery module 113, the first valve 151 may open the second connection line 142 such that the refrigerant supplied from the compressor 132 is introduced to the chiller 160.

In addition, the second valve 152 opens the fourth connection line 144 such that the refrigerant having passed through the chiller 160 is supplied to the internal condenser 133a.

In the present embodiment, a first end of the fifth connection line 145 may be connected to the third valve 153 provided to the refrigerant line 131 between the main heat exchanger 134 and the sub-heat exchanger 134a. A second end of the fifth connection line 145 may be connected to the accumulator 137.

That is, the fifth connection line 145 may selectively introduce the refrigerant discharged from the main heat exchanger 134 directly to the accumulator 137 by the operation of the third valve 153.

Here, in the heating mode or the heating and dehumidifying mode of the vehicle interior, the third valve 153 may open the fifth connection line 145 and close the refrigerant line 131 connected to the sub-heat exchanger 134a.

To the contrary, in the cooling mode of the vehicle interior, the third valve 153 may close the fifth connection line 145 and may open the refrigerant line 131 connected to the sub-heat exchanger 134a.

In the present embodiment, a first end of the sixth connection line 146 may be connected to the refrigerant line 131 between the main heat exchanger 134 and the third expansion valve 139. A second end of the sixth connection line 146 may be connected to the fourth valve 154.

Here, in the heating mode or the heating and dehumidifying mode of the vehicle interior, the sixth connection line 146 may be selectively opened and closed by the operation of the fourth valve 154.

In other words, in the case of the heating mode or the heating and dehumidifying mode of the vehicle interior, the fifth connection line 145 may be opened by the operation of the third valve 153. In addition, the sixth connection line 156 may be opened by the operation of the fourth valve 154.

A first end of the seventh connection line 147 may be connected to the fourth valve 154. A second end of the seventh connection line 147 may be connected to the refrigerant line 131 between the sub-heat exchanger 134a and the third valve 153.

In the heating mode of the vehicle interior, the seventh connection line 147 may be selectively opened by the operation of the fourth valve 154.

That is, the seventh connection line 147 may provide a portion of the refrigerant supplied to the main heat exchanger 134 with a bypass to the sub-heat exchanger 134a.

To the contrary, in the case of the heating and dehumidifying mode of the vehicle interior, the seventh connection line 147 may be closed by the operation of the fourth valve 154.

In addition, a first end of the dehumidification line 148 may be connected to the fourth valve 154. A second end of the dehumidification line 148 may be connected to the refrigerant line 131 between the first expansion valve 135 and the evaporator 136.

Here, in the heating and dehumidifying mode of the vehicle interior, the dehumidification line 148 may be opened by the operation of the fourth valve 154.

In the present embodiment, the first expansion valve 135 may be a mechanical expansion valve, and the second expansion valve 138 may be a 3-way electronic expansion valve capable of selectively expanding the refrigerant while controlling flowing of the refrigerant passing through the first connection line 141.

In addition, the third expansion valve 139 may be a 2-way electronic expansion valve capable of selectively expanding the refrigerant while controlling flowing of the refrigerant passing through the refrigerant line 131.

Meanwhile, the first, second, third, and fourth valves 151, 152, 153, and 154 may each be a 3-way valve capable of distributing flow rates of the refrigerant while controlling flowing of the refrigerant.

Hereinafter, the operation and action of a heat pump system of a vehicle according to an embodiment configured as described above is described in detail with reference to FIG. 6 to FIG. 8.

First, the operation for cooling the battery module 113 in the cooling mode of the vehicle interior is described with reference to FIG. 6.

Figure 6:
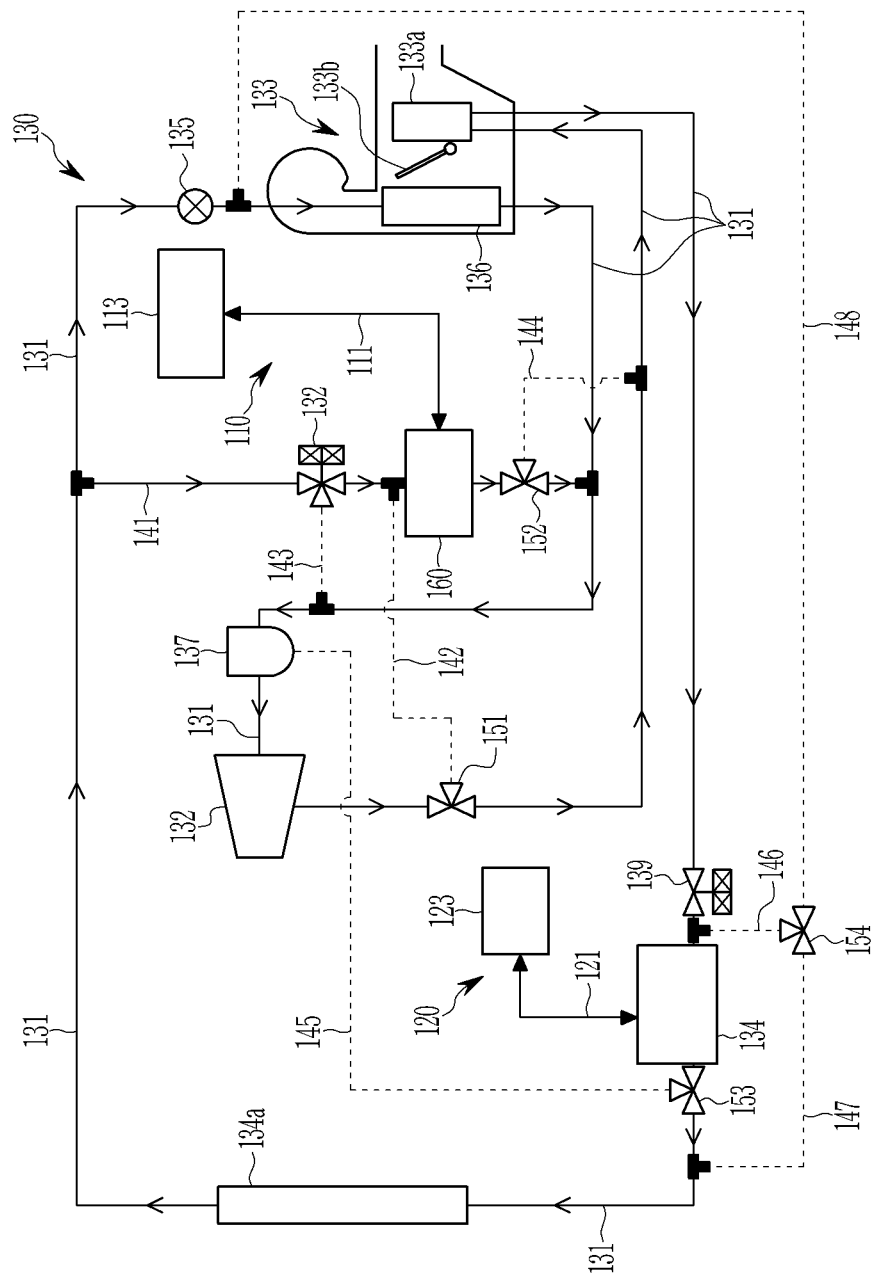
FIG. 6 is an operation diagram for cooling a battery module in a cooling mode of a vehicle interior in a heat pump system of a vehicle according to another embodiment.

FIG. 6 is an operation diagram for cooling a battery module in the cooling mode of the vehicle interior in a heat pump system of a vehicle according to another embodiment.

Referring to FIG. 6, the first and second cooling devices 110 and 120 supply the coolant to the main heat exchanger 134 and the chiller 160 through the first and second lines 111 and 121 respectively connected to the main heat exchanger 134 and the chiller 160.

In the air conditioner unit 130, corresponding components operate in order to cool the vehicle interior. Accordingly, the refrigerant circulates along the refrigerant line 131.

Here, the refrigerant line 131 connecting the sub-heat exchanger 134a and the evaporator 136 is opened by the operation of the first expansion valve 135. The first connection line 141 is opened by the operation of the second expansion valve 138.

In addition, the third expansion valve 139 may supply the refrigerant supplied from the internal condenser 133a to the main heat exchanger 134 in an unexpanded state.

In addition, the second connection line 142 is closed by the operation of the first valve 151. Simultaneously, the fourth connection line 144 is closed by the operation of the second valve 152.

At this time, the second valve 152 may operate such that the first connection line 141 may be connected to the refrigerant line 131 between the evaporator 136 and the accumulator 137.

Meanwhile, the third connection line 143 is closed by the operation of the second expansion valve 138.

The fifth connection line 145 is closed by the operation of the third valve 153. In addition, the third valve 153 may open the refrigerant line 131 connected to the sub-heat exchanger 134a such that the main heat exchanger 134 is connected to the sub-heat exchanger 134a.

In addition, the sixth connection line 146, the seventh connection line 147, and the dehumidification line 148 are closed by the operation of the fourth valve 154.

Then, the refrigerant having passed through the sub-heat exchanger 134a may circulate along the refrigerant line 131 and the first connection line 141.

Here, the first and second expansion valves 135 and 138 may expand the refrigerant such that the expanded refrigerant is respectively supplied to the evaporator 136 and the chiller 160.

In addition, the sub-heat exchanger 134a may additionally condense the refrigerant introduced from the main heat exchanger 134 through heat exchange with the ambient air.

In addition, the main heat exchanger 134 condenses the refrigerant by using the coolant flowing through the second line 121.

Meanwhile, the coolant having passed through the chiller 160 is cooled through heat exchange with the expanded refrigerant supplied to the chiller 160.

Meanwhile, the coolant having passed through the chiller 160 may cool the battery module 113 provided in the first cooling device 110.

That is, the coolant passing through the chiller 160 is cooled through heat exchange with the expanded refrigerant supplied to the chiller 160.

The coolant cooled at the chiller 160 is supplied to the battery module 113 along the first line 11. Accordingly, the battery module 113 may be efficiently cooled by the coolant cooled at the chiller 160.

That is, the second expansion valve 138 expands a portion of the refrigerant having passed through the sub-heat exchanger 134a to supply the expanded refrigerant to the chiller 160.

Therefore, a portion of the refrigerant discharged at the sub-heat exchanger 134a is converted to a state of low temperature and low pressure by being expanded by the operation of the second expansion valve 138 and flows to the chiller 160 provided on the first connection line 141.

Then, the refrigerant introduced to the chiller 160 heat-exchanges with the coolant and flows to the compressor 132 after passing through the accumulator 137 through the refrigerant line 131 connected to the first connection line 141.

Meanwhile, the remaining refrigerant discharged at the sub-heat exchanger 134a flows through the refrigerant line 131 to cool the vehicle interior and sequentially passes through the first expansion valve 135, the evaporator 136, the accumulator 137, the compressor 132, the internal condenser 133a, and the main heat exchanger 134.

Here, the ambient air introduced to the HVAC module 133 is cooled by the refrigerant in the low temperature state introduced to the evaporator 136 while passing through the evaporator 136.

At this time, the opening/closing door 133b closes the region passing through the internal condenser 133a such that the cooled ambient air does not pass through the internal condenser 133a. Therefore, the cooled ambient air directly flows into the vehicle interior to cool the vehicle interior.

Meanwhile, the refrigerant is expanded and supplied to the evaporator 136 with its condensation being increased while sequentially passing through the main heat exchanger 134 and the sub-heat exchanger 134a, and thereby the refrigerant may be evaporated at a lower temperature.

That is, in the present embodiment, since the main heat exchanger 134 condenses the refrigerant through heat exchange with the coolant, and the sub-heat exchanger 134a additionally condenses the refrigerant through heat exchange with the ambient air, it may be beneficial to forming sub-cooling of the refrigerant.

In addition, as the refrigerant formed with sub-cooling is evaporated to a lower temperature at the evaporator 136, the temperature of the ambient air passing through the evaporator 136 may be further lowered, thereby improving the cooling performance and efficiency.

In the cooling mode of the vehicle interior, the refrigerant may cool the vehicle interior while repeating the above-described processes, and at the same time, may cool the coolant through heat exchange while passing through the chiller 160.

The coolant of a low temperature cooled at the chiller 160 flows to the battery module 113 through the first line 11. Accordingly, the battery module 113 may be efficiently cooled by the supplied low temperature coolant.

In the present embodiment, the operation for heating the battery module 113 in the heating mode of the vehicle interior is described with reference to FIG. 7.

Figure 7:
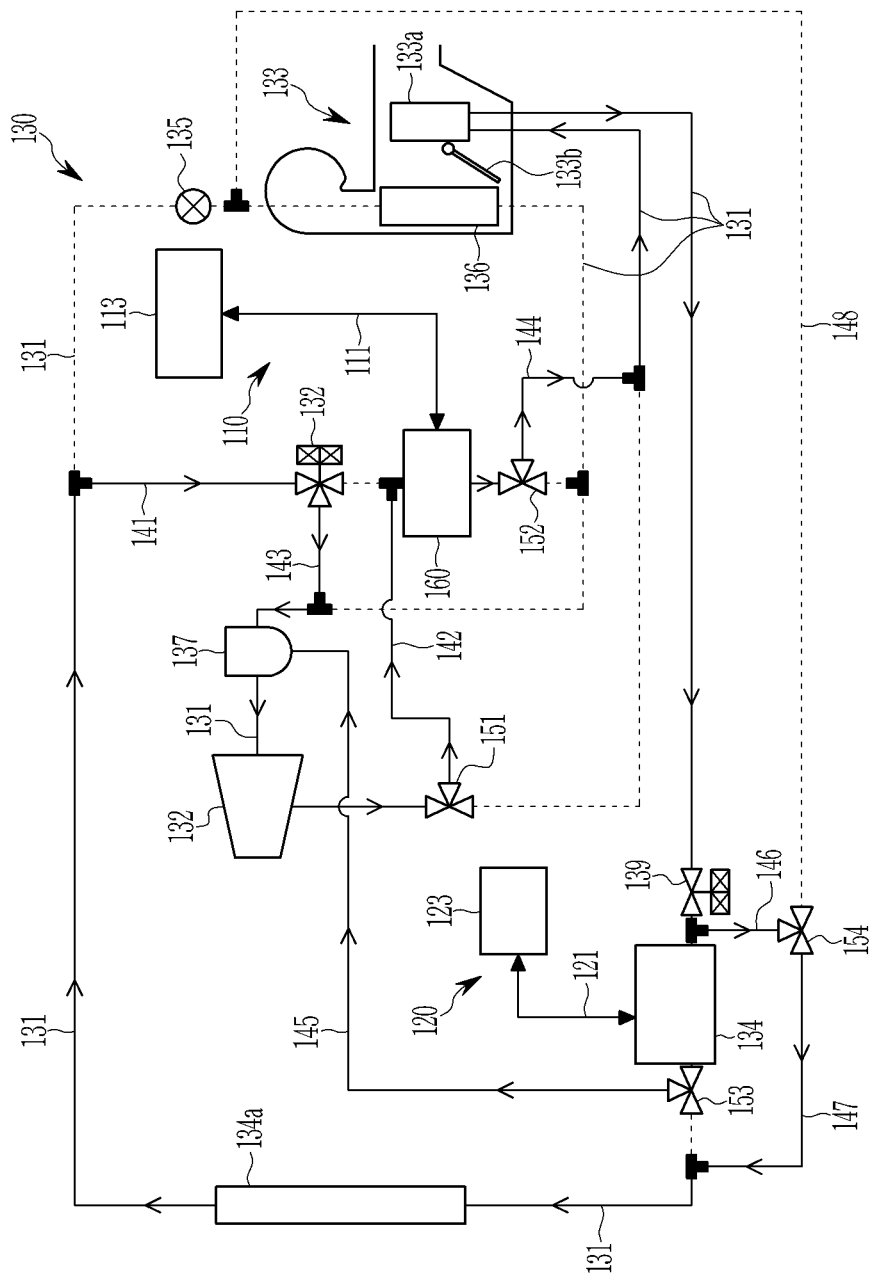
FIG. 7 is an operation diagram for heating a battery module in a heating mode of a vehicle interior in a heat pump system of a vehicle according to another embodiment.

FIG. 7 is an operation diagram for heating a battery module in the heating mode of the vehicle interior in a heat pump system of a vehicle according to another embodiment.

Referring to FIG. 7, the first and second cooling devices 110 and 120 supply the coolant to the main heat exchanger 134 and the chiller 160 through the first and second lines 111 and 121 respectively connected to the main heat exchanger 134 and the chiller 160.

In the air conditioner unit 130, corresponding components operate in order to heat the vehicle interior. Accordingly, the refrigerant circulates along the refrigerant line 131.

Here, the refrigerant line 131 connecting the sub-heat exchanger 134a and the evaporator 136 is closed by the operation of the first expansion valve 135.

In addition, a portion of the first connection line 141 connecting the chiller 160 and the second expansion valve 138 is closed by the operation of the second expansion valve 138.

At this time, the third connection line 143 is opened by the operation of the second expansion valve 138.

Accordingly, the refrigerant discharged from the sub-heat exchanger 134a flows to the second expansion valve 138 along the refrigerant line 131 and the portion of the first connection line 141.

The second expansion valve 138 may discharge the introduced refrigerant to the third connection line 143 in an unexpanded state.

The refrigerant discharged through the third connection line 143 may flow to the accumulator 137 along the refrigerant line 131.

Meanwhile, the second connection line 142 is opened by the operation of the first valve 151. Here, the first valve 151 may close a portion of the refrigerant line 131 connected to the second end of the fourth connection line 144.

Simultaneously, the fourth connection line 144 is opened by the operation of the second valve 152. At this time, the second valve 152 may operate such that a portion of the first connection line 141 connected to the chiller 160 is connected to the fourth connection line 144.

The fifth connection line 145 is opened by the operation of the third valve 153. In addition, the third valve 153 may close a portion of the refrigerant line 131 connected to the sub-heat exchanger 134*a* such that the main heat exchanger 134 is not connected to the sub-heat exchanger 134*a*.

In addition, the sixth connection line 146 and the seventh connection line 147 are opened by the operation of the fourth valve 154. At this time, the dehumidification line 148 is closed by the operation of the fourth valve 154.

In addition, the third expansion valve 139 may supply the refrigerant supplied from the internal condenser 133*a* to the main heat exchanger 134 in an expanded state.

Accordingly, the main heat exchanger 134 may evaporate the expanded refrigerant through heat exchange with the coolant.

The refrigerant evaporated at the main heat exchanger 134 is supplied to the accumulator 137 along the fifth connection line 145.

The refrigerant supplied to the accumulator 137 is separated into gas and liquid. The gas refrigerant among the separated gas and liquid refrigerants is supplied to the compressor 132.

The refrigerant compressed to the state of high temperature and high pressure at the compressor 132 flows to the chiller 160 along the opened second connection line 142.

The refrigerant introduced to the chiller 160 may heat-exchange with the coolant supplied from the first cooling device 110. Here, the coolant may be heated through heat exchange with the refrigerant in the high temperature state.

The heated coolant is supplied to the battery module 113 along the first line in and may efficiently increase the temperature of the battery module 113.

Meanwhile, the refrigerant having passed through the chiller 160 may flow sequentially through the portion of the first connection line 141, the second valve 152, and the fourth connection line 144.

Then, refrigerant flows into the internal condenser 33*a* along the refrigerant line 131 connected to the fourth connection line 144.

Here, the refrigerant supplied to the internal condenser 133*a* may increase the temperature of the ambient air introduced to the HVAC module 133.

The opening/closing door 133*b* is opened such that the ambient air introduced to the HVAC module 133 and having passed through the evaporator 136 passes through the internal condenser 133*a*.

Accordingly, the ambient air introduced from outside is introduced in the state of the room temperature without being cooled for passing through the evaporator 136 that is not supplied with the refrigerant. The introduced ambient air may be converted into the high temperature state while passing through the internal condenser 133*a* and flow into the vehicle interior, thereby realizing heating of the vehicle interior.

Meanwhile, the refrigerant having passed through the internal condenser 133*a* flows to the main heat exchanger 134 along the refrigerant line 131 that is opened by the operation of the third expansion valve 139.

At this time, the third expansion valve 139 may expand the refrigerant supplied from the internal condenser 133*a*.

A portion of the refrigerant expanded at the third expansion valve 139 may be evaporated at the main heat exchanger 134 through heat exchange with the coolant supplied from the second cooling device 120.

The refrigerant evaporated at the main heat exchanger 134 flows to the accumulator 137 along the fifth connection line 145 and may flow as described above.

Meanwhile, the remaining refrigerant expanded at the third expansion valve 139 may flow along the sixth connection line 146 and the seventh connection line 147 that are open and may flow to the sub-heat exchanger 134*a* along the refrigerant line 131 connected to the seventh connection line 147.

Here, the sub-heat exchanger 134*a* may additionally evaporate the introduced refrigerant through heat exchange with the ambient air.

The refrigerant evaporated at the sub-heat exchanger 134*a* may, as described above, sequentially pass through the refrigerant line 131, the portion of the first connection line 141, and the second expansion valve 138, and then flow into the third connection line 143.

Therefore, while repeating the above-described processes, a heat pump system according to an embodiment may minimize the use of a separate electric heater for increasing the temperature of the battery module 113 and improve the heating efficiency and performance.

In the present embodiment, the operation in the heating and dehumidifying mode of the vehicle interior is described with reference to FIG. 8.

Figure 8:
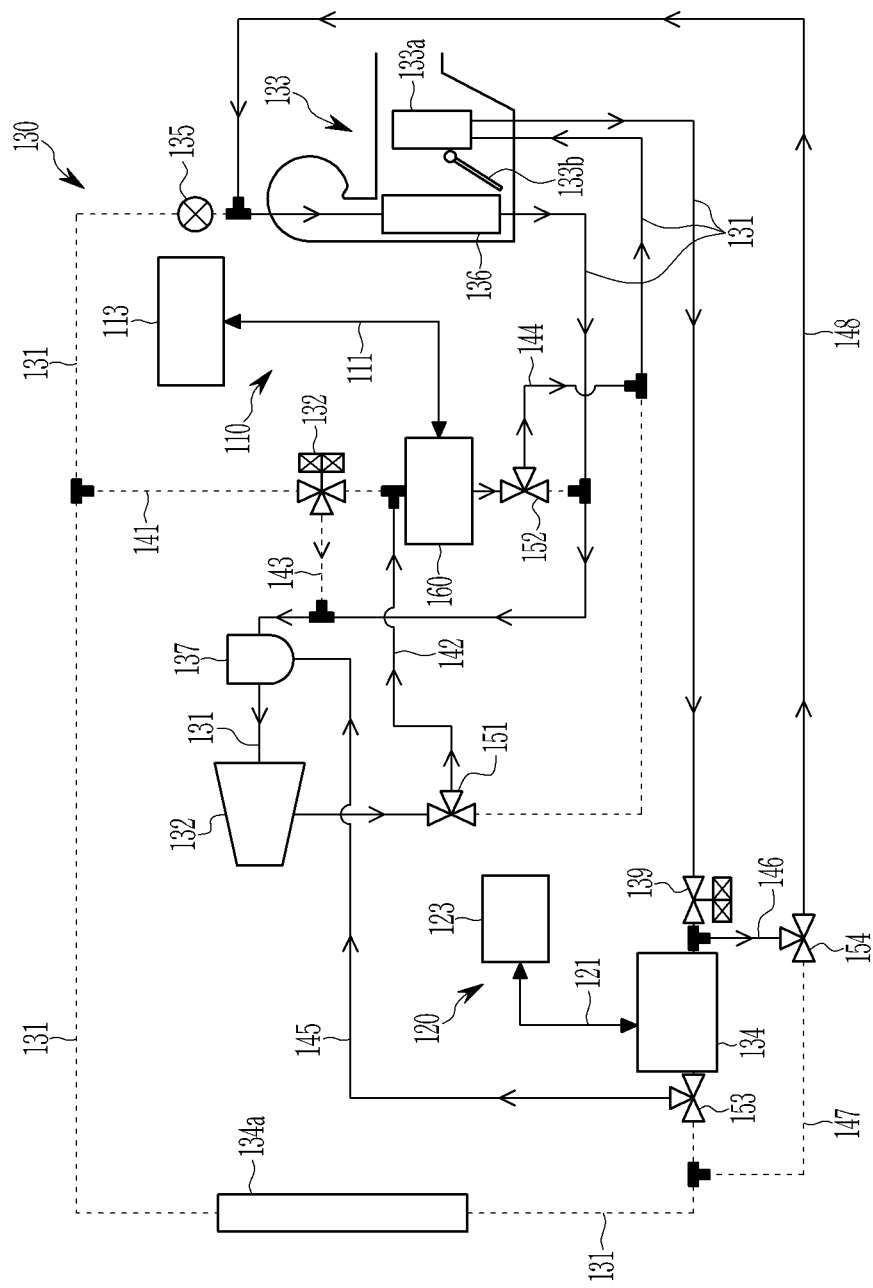
FIG. 8 is an operation diagram for heating a battery module in a heating and dehumidifying mode of a vehicle interior in a heat pump system of a vehicle according to another embodiment.

FIG. 8 is an operation diagram for heating a battery module in the heating and dehumidifying mode of the vehicle interior in a heat pump system of a vehicle according to another embodiment.

Referring to FIG. 8, the first and second cooling devices 110 and 120 supply the coolant to the main heat exchanger 134 and the chiller 160 through the first and second lines 111 and 121 respectively connected to the main heat exchanger 134 and the chiller 160.

In the air conditioner unit 130, corresponding components operate in order to heat and dehumidify the vehicle interior. Accordingly, the refrigerant circulates along the refrigerant line 131.

Here, the refrigerant line 131 connecting the sub-heat exchanger 134*a* and the evaporator 136 is closed by the operation of the first expansion valve 135.

In addition, the first connection line 141 connecting the sub-heat exchanger 134*a* and the chiller 160 is closed by the operation of the second expansion valve 138.

At this time, the third connection line 143 is closed by the operation of the second expansion valve 138.

Meanwhile, the second connection line 142 is opened by the operation of the first valve 151. Here, the first valve 151 may close the portion of the refrigerant line 131 connected to the second end of the fourth connection line 144.

Simultaneously, the fourth connection line 144 is opened by the operation of the second valve 152. At this time, the second valve 152 may operate such that the portion of the first connection line 141 connected to the chiller 160 is connected to the fourth connection line 144.

The fifth connection line 145 is opened by the operation of the third valve 153. In addition, the third valve 153 may close the portion of the refrigerant line 131 connected to the sub-heat exchanger 134*a* such that the main heat exchanger 134 is not connected to the sub-heat exchanger 134*a*.

In addition, the sixth connection line 146 and the dehumidification line 148 are opened by the operation of the fourth valve 154. At this time, the seventh connection line 147 is closed by the operation of the fourth valve 154.

Here, the third expansion valve 139 may supply the refrigerant supplied from the internal condenser 133a to the main heat exchanger 134 in an expanded state.

Accordingly, the main heat exchanger 134 may evaporate the expanded refrigerant through heat exchange with the coolant.

Meanwhile, the sixth connection line 146 and the dehumidification line 148 may be opened by the operation of the fourth valve 154 such that a portion of the expanded refrigerant is supplied to the evaporator 136 by the operation of the third expansion valve 139.

Accordingly, a portion of the refrigerant expanded at the third expansion valve 139 may flow into the evaporator 166 through the opened sixth connection line 146 and the dehumidification line 148.

The refrigerant evaporated at the main heat exchanger 134 is supplied to the accumulator 137 along the fifth connection line 145.

The refrigerant supplied to the accumulator 137 is separated into gas and liquid. The gas refrigerant among the separated gas and liquid refrigerants is supplied to the compressor 132.

The refrigerant compressed to the state of high temperature and high pressure at the compressor 132 flows to the chiller 160 along the opened second connection line 142.

The refrigerant introduced to the chiller 160 may heat-exchange with the coolant supplied from the first cooling device 110. Here, the coolant may be heated through heat exchange with the refrigerant in the high temperature state.

The heated coolant is supplied to the battery module 113 along the first line 11 and may efficiently increase the temperature of the battery module 113.

Meanwhile, the refrigerant having passed through the chiller 160 may flow sequentially through the portion of the first connection line 141, the second valve 152, and the fourth connection line 144.

Then, refrigerant flows into the internal condenser 133a along the refrigerant line 131 connected to the fourth connection line 144.

Here, the refrigerant supplied to the internal condenser 133a may increase the temperature of the ambient air introduced to the HVAC module 133.

The opening/closing door 133b is opened such that the ambient air introduced to the HVAC module 133 and having passed through the evaporator 136 passes through the internal condenser 133a.

That is, the ambient air introduced to the HVAC module 133 is dehumidified while passing through the evaporator 136 by the refrigerant in the low temperature state introduced to the evaporator 136. Then, the introduced ambient air may be converted into the high temperature state while passing through the internal condenser 133a and flow into the vehicle interior, thereby heating and dehumidifying the vehicle interior smoothly.

Meanwhile, the refrigerant having passed through the internal condenser 133a flows to the main heat exchanger 134 along the refrigerant line 131 that is opened by the operation of the third expansion valve 139.

At this time, the third expansion valve 139 may expand the refrigerant supplied from the internal condenser 133a.

The portion of the refrigerant expanded at the third expansion valve 139 may be evaporated at the main heat exchanger 134 through heat exchange with the coolant supplied from the second cooling device 120.

The refrigerant evaporated at the main heat exchanger 134 flows to the accumulator 137 along the fifth connection line 145 and may flow as described above.

Meanwhile, the remaining refrigerant expanded at the third expansion valve 139 may flow along the sixth connection line 146 and the dehumidification line 148 that are open and may flow to the evaporator 136 along the refrigerant line 131 connected to the dehumidification line 148.

The refrigerant evaporated at the evaporator 136 may, as described above, flow into the compressor 132 after passing through the accumulator 137 along the refrigerant line 131.

Therefore, according to a heat pump system according to an embodiment, while repeating the above-described processes, the use of a separate electric heater for increasing the temperature of the battery module 113 may be minimized thereby improving the heating efficiency and performance, and at the same time, the vehicle interior may be dehumidified.

Therefore, according to a heat pump system of a vehicle according to another embodiment, the temperature of the battery module 113 is adjusted according to the vehicle mode by using a single chiller 160 at which the coolant and the refrigerant are heat-exchanged, and accordingly the system may be streamlined and simplified.

In addition, according to an embodiment, by efficiently adjusting the temperature of the battery module 113, the optimal performance of the battery module 113 may be enabled, and the overall travel distance of the vehicle may be increased due to the efficient management of the battery module 113.

In addition, according to an embodiment, the temperature of the battery module 113 may be efficiently increased by using the coolant heated while passing through the chiller 160 through the selective operation of the air conditioner unit 130, and the usage of a separate electric heater may be minimized, thereby reducing unnecessary electric power consumption.

In addition, according to an embodiment, the main heat exchanger 134 that condenses or evaporates the refrigerant by using the coolant and the sub-heat exchanger 134a that condenses or evaporates the refrigerant through heat exchange with the ambient air are applied to increase the performance of condensing or evaporating the refrigerant, and thereby the cooling performance may be improved while reducing the power consumption of the compressor.

In addition, according to an embodiment, it is possible to reduce manufacturing cost and weight through simplification of an entire system and to improve space utilization.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system of a vehicle, the heat pump system comprising:
a first cooling device comprising a battery module and a first line, the first cooling device being configured to circulate a coolant through the first line;
an air conditioner unit comprising a compressor, an internal condenser, a main heat exchanger, a first expansion valve, and an evaporator that are interconnected through a refrigerant line, the air conditioner unit being configured to circulate a refrigerant through the refrigerant line; and a chiller connected to the first cooling device through the first line, connected to the refrigerant line through a first connection line, and configured to adjust a coolant temperature through heat-exchanging a selectively introduced coolant with the refrigerant supplied from the air conditioner unit;

wherein the air conditioner unit further comprises:
a second expansion valve provided on the first connection line upstream of the chiller;
a first valve provided on the refrigerant line between the internal condenser and the main heat exchanger;
a second valve provided on the first connection line at a downstream end of the chiller;
a second connection line having a first end connected to the first valve and a second end connected to the first connection line between the chiller and the second expansion valve;
a third connection line having a first end connected to the second expansion valve and a second end connected to the refrigerant line between the evaporator and the compressor; and
a fourth connection line having a first end connected to the second valve and a second end connected to the refrigerant line between the main heat exchanger and the first valve.

2. The heat pump system of claim 1, wherein the air conditioner unit further comprises:
a heating, ventilation, and air conditioning module internally provided with the evaporator and an opening/closing door configured to adjust a selective flow of ambient air having passed through the evaporator to the internal condenser according to a cooling mode, a heating mode, or a heating and dehumidifying mode of a vehicle interior;
a sub-heat exchanger provided on the refrigerant line between the main heat exchanger and the evaporator;
an accumulator provided on the refrigerant line between the evaporator and the compressor;
a third expansion valve provided on the refrigerant line between the first valve and the main heat exchanger;
a fifth connection line having a first end connected to a third valve provided on the refrigerant line between the main heat exchanger and the sub-heat exchanger and a second end connected to the accumulator;
a sixth connection line having a first end connected to the refrigerant line between the main heat exchanger and the third expansion valve;
a fourth valve connected to a second end of the sixth connection line;
a seventh connection line having a first end connected to the fourth valve and a second end connected to the refrigerant line between the sub-heat exchanger and the third valve; and
a dehumidification line having a first end connected to the fourth valve and a second end connected to the refrigerant line between the first expansion valve and the evaporator.

3. The heat pump system of claim 2, wherein:
a first end of the first connection line is connected to the refrigerant line between the sub-heat exchanger and the first expansion valve; and
a second end of the first connection line is connected to the refrigerant line between the accumulator and the evaporator.

4. The heat pump system of claim 2, wherein, in order to cool the battery module using the coolant having heat-exchanged at the chiller, the second expansion valve is configured to expand the refrigerant introduced through the first connection line and introduce the expanded refrigerant to the chiller.

5. The heat pump system of claim 2, wherein, in order to increase a temperature of the battery module:
the first valve is configured to open the second connection line such that the refrigerant supplied from the internal condenser is introduced to the chiller; and
the second valve is configured to open the fourth connection line such that the refrigerant having passed through the chiller is supplied to the main heat exchanger.

6. The heat pump system of claim 2, wherein, in the cooling mode of the vehicle interior, the third expansion valve is configured to allow the refrigerant supplied from the internal condenser to flow through the refrigerant line in an unexpanded state.

7. The heat pump system of claim 2, wherein, in the heating mode or the heating and dehumidifying mode of the vehicle interior:
the third valve is configured to operate to open the fifth connection line; and
the fourth valve is configured to operate to open the sixth connection line.

8. The heat pump system of claim 2, wherein the fourth valve is configured to:
operate to open the seventh connection line in the heating mode of the vehicle interior; and
operate to close the seventh connection line in the heating and dehumidifying mode of the vehicle interior.

9. The heat pump system of claim 2, wherein:
each of the first valve, the second valve, the third valve, and the fourth valve comprises a three-way valve configured to distribute flow rates of the refrigerant while controlling a flow of the refrigerant;
the second expansion valve comprises a three-way electronic expansion valve configured to selectively expand the refrigerant while controlling the flow of the refrigerant; and
the third expansion valve comprises a two-way electronic expansion valve configured to selectively expand the refrigerant while controlling the flow of the refrigerant.

10. The heat pump system of claim 2, wherein:
the main heat exchanger is connected to a second cooling device comprising an electrical component and a second line, wherein the second cooling device is configured to circulate the coolant through the second line; and
the main heat exchanger is configured to condense or evaporate an interiorly introduced refrigerant through heat exchange with the coolant supplied from the second cooling device according to a selective operation of the third expansion valve.

11. The heat pump system of claim 10, wherein the sub-heat exchanger is configured to additionally condense or evaporate the interiorly introduced refrigerant condensed or evaporated at the main heat exchanger through heat exchange with the ambient air.

* * * * *